United States Patent [19]
Sato et al.

[11] Patent Number: 5,997,836
[45] Date of Patent: Dec. 7, 1999

[54] ALKALI ALUMINUM COMPLEX HYDROXIDE CARBONATE SALT, AND A PROCESS FOR PRODUCING SAID SALT AND ITS USES

[75] Inventors: Teiji Sato; Yoshinobu Komatsu; Katsumi Higuchi; Masami Kondo; Akira Tatebe, all of Tokyo, Japan

[73] Assignee: Mizusawa Industrial Chemicals, Ltd., Tokyo, Japan

[21] Appl. No.: 08/817,879

[22] PCT Filed: Sep. 2, 1996

[86] PCT No.: PCT/JP96/02470

§ 371 Date: May 1, 1997

§ 102(e) Date: May 1, 1997

[87] PCT Pub. No.: WO97/09274

PCT Pub. Date: Mar. 13, 1997

[30] Foreign Application Priority Data

| Sep. 1, 1995 | [JP] | Japan | 7-248810 |
| Apr. 11, 1996 | [JP] | Japan | 8-113032 |
| Aug. 1, 1996 | [JP] | Japan | 8-218135 |

[51] Int. Cl.$^6$ ............................................ C01B 31/30
[52] U.S. Cl. ............................ 423/420.2; 423/179.5
[58] Field of Search ............................ 423/420.2, 179.5; 524/424; 510/399; 106/38.24, 286.2, 287.34, 401

[56] References Cited

U.S. PATENT DOCUMENTS

| 2,783,127 | 2/1957 | Grote | 423/420.2 |
| 3,031,417 | 4/1962 | Bruce | 423/630 X |
| 3,115,387 | 12/1963 | Lewin | 423/420.2 |
| 4,221,771 | 9/1980 | van der Heem | 423/420.2 |
| 4,356,157 | 10/1982 | Altman | 423/420.2 |
| 4,376,231 | 3/1983 | Sabia et al. | 428/372 X |
| 5,194,470 | 3/1993 | Carette et al. | 252/400.31 |
| 5,419,883 | 5/1995 | Ogawa et al. | 423/122 |

FOREIGN PATENT DOCUMENTS

| 0549340 | 6/1993 | European Pat. Off. . |
| 0672619 | 9/1995 | European Pat. Off. . |

OTHER PUBLICATIONS

C.J. Serna, et al., "Hydrolysis of Aluminum–Tri–(Sec–Butoxide) In Ionic and Nonionic Media", Clays and Clay Minerals, 25, pp. 384–391 (1977). No month.

Chemical Abstracts, 76, No. 16, Apr. 17, 1972, Abstract No. 87929.

*Primary Examiner*—Michael Lewis
*Assistant Examiner*—Stuart L. Hendrickson
*Attorney, Agent, or Firm*—Sherman and Shalloway

[57] ABSTRACT

According to this invention, an amorphous or pseudo-boehmite-type hydrated alumina gel and an alkali metal carbonate or bicarbonate as starting materials are reacted in an aqueous medium to give a method of producing a process for producing an alkali aluminum complex hydroxide carbonate salt which is industrially low-cost and has high productivity. Furthermore, by using a gibbsite-type hydrated alumina, a lithium aluminum complex hydroxide carbonate salt can be synthesized by a migration method.

The lithium aluminum complex hydroxide carbonate salt and the sodium aluminum complex hydroxide carbonate salt obtained by the processes of the present invention have excellent compoundability in pigments and resins.

In addition, these complex salts have no foaming hazards at the time of processing the resins and are useful as resin fillers for halogen capturing property, infrared ray absorbing property and excellent transparency. They are especially useful as a stabilizer (halogen capturing agent) for resin films, a warmth-keeping agent (infrared absorbing agent) and an anti-blocking agent.

14 Claims, 16 Drawing Sheets

ALKALI ALUMINUM COMPLEX HYDROXIDE CARBONATE SALT, AND A PROCESS FOR PRODUCING SAID SALT AND ITS USES

TECHNICAL FIELD

This invention relates to an alkali aluminum complex hydroxide carbonate salt having a lithium aluminum complex-type or dawsonite-type crystal structure, a process for producing said salt, and its uses. More specifically, it relates to an alkali aluminum complex hydroxide carbonate salt which is useful as a heat stabilizer (halogen trapping) for olefin resins containing a chlorine-containing polymer or halogen-containing catalyst residues, and an anti-blocking agent or a warmth-retaining agent (infrared absorbing agent) of a thermoplastic resin film, and a process for producing said salt.

The present invention also relates to uses of the above-mentioned salt. It especially relates to a resin compounding agent which is easy to compound in film-forming resins and can form warmth-retaining resin films having excellent infrared absorbability and transparency.

BACKGROUND TECHNOLOGY

Chlorine-containing polymers such as a vinyl chloride polymer are liable to be colored by heat-decomposition reaction such as de-hydrochlorination or to be reduced in mechanical properties in heat molding processing or subsequent heat histories. To prevent the above troubles, it is generally required to compound stabilizers.

Olefin-type resins produced by using Ziegler-type catalysts contain halogen-containing catalyst residues. These residues generate hydrogen chloride at the time of heating and molding to cause rust in the molding machines or generate deterioration in the resins, for example, yellowing. To prevent this deterioration, stabilizers which trap hydrogen chloride were compounded widely.

The use of hydrotalcite as such a stabilizer has been knonwn from old. For example, Japanese Laid-Open Patent Publication No. 80445/1980 describes that hydrotalcite is used as a stabilizer for halogen-containing resins. Further, Japanese Patent Publication No. 36012/1983 shows that a β-diketone compound and a hydrotalcite of formula (1)

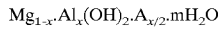

$$Mg_{1-x}\cdot Al_x(OH)_2\cdot A_{x/2}\cdot mH_2O \tag{1}$$

wherein x denotes a number of $0<\leqq<0.5$, A represents $CO_3^{2-}$ or $SO_4^{2-}$, and m represents a positive number are compounded in a halogen-containing resin.

Furthermore, Japanese Patent Publication No. 30737/1984 discloses that at least 0.01% by weight of a complex compound represented by general formula (2)

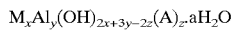

$$M_xAl_y(OH)_{2x+3y-2z}(A)_z\cdot aH_2O \tag{2}$$

wherein M represents Mg, Ca or Zn, A represents $CO_3$ or $HPO_4$, x, y and z represent a positive number, and a is zero or a positive number,
is compounded in a polyolefin containing halogen-containing catalyst residues produced by using a Ziegler-type catalyst.

Hydrotalcites are non-toxic complex hydroxide and carbonate salts of magnesium and aluminum, have excellent heat stability, and are transparent when compounded in a polymer.

These hydrotalcites ideally have a chemical composition expressed by formula (3)

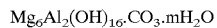

$$Mg_6Al_2(OH)_{16}\cdot CO_3\cdot mH_2O \tag{3}$$

wherein m is 0 or a positive number.

However, Mg and Al, within a very broad range, form a solid solution as shown by formula (1) or (2), and there is a problem in that it is difficult to form a composition having a strictly constant composition.

A report of C. J. Serna et al. entitled "Crystal-Chemical Study of Layered $[Al_2Li(OH)_6]^+X^-\cdot nH_2O$" (Clays and Clay Minerals, Vol. 25, page 384 (1977)) describes that a lithium aluminum complex hydroxide salt is synthesized by adding a benzene solution of aluminum tri(sec-butoxide) (ASB) as liquid drops to an excessive aqueous solution of lithium carbonate, hydrolyzing ASB, washing the resulting gel, and thereafter, hydrothermally treating the washed gel for several days at 130° C.

A report of I. Sissoko et al. entitled "Anion Intercalation and Exchange in $Al(OH)_3$-Derived Compounds" (Journal of Solid State Chemistry, Vol. 25, pages 283–288 (1985) describes that a lithium aluminum complex hydroxide salt is produced by adding $AlCl_3$ as liquid drops to an aqueous solution containing LiOH and $Na_2CO_3$ (or $Na_2SO_4$), changing the pH from 13 in the early period to 10.2 in the last stage to form a gel-like precipitate, and aging the precipitate with stirring (see Comparative Example 6 and FIG. 6 to be given below).

U.S. Pat. Nos. 4,116,856 and 4,221,767 disclose that crystals of lithium. aluminum complex hydroxide salt are produced by reacting amorphous $Al(OH)_3$ or crystalline hydrated alumina (such as nordstrandite, bayerite, gibbsite) with LiOH, and then reacting the mixture with LiX (wherein X represents a halide). However, the resulting crystals are sol-like and are very difficult to filter.

U.S. Pat. Nos. 5,356,567, 5,360,859, and 5,419,883 describe a lithium aluminum complex hydroxide salt (to be referred to as LAHS) of general formula (4)

$$[Al_2Li(OH)_6]_nX\cdot mH_2O \tag{4}$$

wherein X is an inorganic or organic anion, n is the valence of the anion, and m is a number of 3 or below, having at least 10, especially at least 20 of an orientation degree (OD) defined by formula (5)

$$OD=I(002)/I(110) \tag{5}$$

wherein I(002) represents a relative intensity of an X-ray diffraction
(Cu-Kα) peak appearing in the index of a plane (002) at a spacing (d) of 7.67 to 7.84 Å, and I(110) represents a relative intensity of an X-ray diffraction (Cu-Kα) peak appearing in the index of a plane (110) at a spacing (d) of 4.41 to 4.45 Å.

For example, as typical examples of LAHS, lithium carbonate and aluminum chloride are reacted in an aqueous solution in the presence of sodium carbonate and sodium hydroxide, a higher fatty acid or a surface-active agent is added as an orientation enhancer to the reaction mixture, and the mixture is treated at a temperature of 60 to 100° C. so that the degree of orientation becomes at least 10.

As another type of the alkali aluminum complex hydroxide carbonate salt, sodium aluminum complex hydroxide carbonate salts having a dawsonite-type crystal structure are known. Methods of synthesizing these salts are known from Japanese Patent Publication No. 38318/1972, Japanese Patent Publication No. 17718/1979, Japanese Laid-Open Patent Publication No. 22628/1981, Japanese Patent Publication No. 44604/1982, Japanese Laid-Open Patent Publication No. 61625/1982, Japanese Laid-Open Patent Publication No. 83933/1984, Japanese Laid-Open Patent Publication No. 100017/1988, Japanese Patent Publication No. 24731/1989, Japanese Patent Publication No. 58205/1990 and Japanese Laid-Open Patent Publication No. 271116/1991.

As a synthesizing method of the above product, Japanese Patent Publication 38313/1972 discloses a method of producing dawsonite which comprises reacting an aluminum salt and sodium carbonate using at least 2 moles of $CO_2$ per mole of $Al_2O_3$, and maintaining the pH of the reaction mixture at 7.2 to 10.5.

However, LAHS synthesized by these known methods is in the form of gel-like particles, and the growth of crystals is still insufficient. The shape and size of these particles are non-uniform, and are still unsatisfactory as a compounding agent for resins.

Furthermore, dawsonite is fibrous. Many of these fibers are entangled in the form of fibrous ball. Accordingly, they are still unsatisfactory in use as a compounding agent for resins.

Furthermore, synthesizing methods for known alkali aluminum complex hydroxide carbonate salts must treat the starting materials and the products as a dilute solution or slurry. Otherwise, the liquids have a high viscosity, and their stirring is difficult. Thus, the productivity is low, and the cost of production is high. Another problem is that the resulting alkali aluminum complex hydroxide carbonate salts are very difficult to filter, and a long period of time is required for the filtration process.

The fate of the alkali aluminum complex hydroxide carbonate salts is that it is essential to use alkali metal compounds as a starting material. These resulting products contain free alkali metal components as impurities in addition to alkali metal components charged into the compounds. These free alkali metal components lead to the defect that they may color the resins in which these alkali metal components are compounded.

DISCLOSURE OF THE INVENTION

The present inventors have found an unexpected fact that when amorphous or pseudo-boehmite type hydrated alumina gel is used as an aluminum component and the concentration of $Al_2O_3$ is maintained at a high level in the reaction system, an alkali aluminum complex hydroxide carbonate salt can be synthesized within a relatively short period of reaction time and the filtration of the product can be very easily carried out.

Furthermore, the present inventors have found that when gibbsite-type aluminum hydroxide is utilized as a mother or template for LAHS and lithium is migrated to the vacancy of gibbsite, a highly crystalline and dense LAHS can be obtained.

An object of this invention is to provide a method for producing an alkali aluminum complex hydroxide carbonate salt in which the reaction can be carried out by maintaining the concentration of the starting material in the reaction mixture at a high level, the synthesis can be performed within a very short period of reaction time, and furthermore, the filtration and washing with water of the reaction product are extremely easy.

Another object of this invention is to provide an alkali aluminum complex hydroxide carbonate salt and its uses in which the dispersion in a resin can be easily carried out and the deterioration tendency of the resin is markedly reduced.

Yet another object of this invention is to provide a lithium aluminum complex hydroxide carbonate salt in which the crystals are grown to a high level, have a large bulk density, and have excellent pigmentability.

A further object of this invention is to provide a process for producing LAHS having excellent producibility and cost, which can be carried out within a very short period of reaction time while maintaining the concentration of the starting material in the reaction system at a high level.

An additional object of this invention is to provide a resin compounding agent composed of the lithium aluminum complex hydroxide carbonate salt.

According to this invention, there is provided a process for producing an alkali aluminum complex hydroxide carbonate salt (to be referred to simply as a hydrated alumina gel method) which comprises reacting amorphous or pseudo-boehmite type hydrated alumina gel with an alkali metal carbonate or bicarbonate in an aqueous medium while maintaining the concentration of alumina ($Al_2O_3$) at 1 to 5% by weight under such conditions in which the pH at the time of termination of the reaction is 7 to 11.

According to this invention, there is also provided a process for producing a lithium aluminum complex hydroxide carbonate salt (to be referred to simply as a migration method) which comprises reacting fine particles of gibbsite-type aluminum hydroxide with a combination of a lithium compound and a carbonate salt capable of forming a lithium salt of carbonic acid or a carbonic acid ion and a lithium ion in the presence of water.

According to this invention, there is further provided a lithium aluminum complex hydroxide carbonate salt (to be referred to as LAHCS) which has a composition represented by formula (6a), $$mAl_2O_3 \cdot nM_2O \cdot X \cdot kH_2O \tag{6a}$$

wherein X represents an inorganic anion composed mainly of a carbonic acid radical, M represents an alkali metal composed mainly of lithium, m is a number of 1.5 to 2.5, n is a number of 0.1 to 1, and k is a number of 0 to 10, and which has an X-ray diffraction pattern shown below

| Spacing d (Å) Index of a plane | Peak intensity |
|---|---|
| 7.50 to 7.64 (002) | Large |
| 4.30 to 4.44 (110) | Small |
| 3.70 to 3.84 (004) | Large |
| 2.45 to 2.58 (006) | Medium |
| 2.20 to 2.30 (016) | Small |
| 1.85 to 2.08 (017) | Small |
| 1.40 to 1.52 (330) | Small |
| 1.38 to 1.48 (600) | Small | the lamination asymmetry index (Is) being

defined by $Is = \tan\theta_2 / \tan\theta_1$ (7)

(wherein $\theta_1$ represents an angle formed between a peak perpendicular and a peak tangent on the narrow angle side at an X-ray diffraction peak of a fixed spacing, and $\theta_2$ represents an angle formed between the peak perpendicular and a peak tangent on the wide angle side at the peak), and IS being 1.0 or below at the peak of an index of a plane (016) and 1.0 or below at the peak of an index of a plane (017), and preferably the LAHCS has a specific resistance of at least 8000 Ω·cm when it is formed as an aqueous slurry having a concentration of 5% by weight.

According to this invention, there is provided a sodium aluminum complex hydroxide carbonate salt (to be referred to as NAHCS) which has a composition of the following formula (6b)

(6b)

wherein X represents an inorganic anion composed mainly of a carbonic acid radical, M represents an alkali metal composed mainly of sodium, m represents a number of 0.5 to 1.5, n represents a number of 0.1 to 1 and k represents a number of 0 to 3, said sodium aluminum complex hydroxide carbonate salt has a dawsonite-type crystalline structure, the half width of the peak of an index of a plane in a Cu-α X-ray diffraction pattern is at least 0.4 degree, and the sodium aluminum complex hydroxide carbonate salt, when formed into an aqueous slurry having a concentration of 5% by weight, has a specific resistance of 8000 Ω·cm or below.

According to this invention, there is also provided a resin compounding agent, especially a warmth-retaining agent or a halogen scavenger for resins, said resin compounding agent being composed of the lithium aluminum complex hydroxide carbonate salt or the dawsonite-type sodium aluminum complex hydroxide carbonate salt.

According to this invention, there are also provided a warmth-retaining resin composition comprising a thermoplastic resin and 0.1 to 50 parts by weight, especially 1 to 20 parts by weight, per 100 parts by weight of the thermoplastic resin, of an alkali aluminum complex hydroxide carbonate salt having a dawsonite-type crystalline structure, and an agricultural film composed of said resin composition.

SIMPLE DESCRIPTION OF DRAWINGS

BEST FORM FOR PRACTISING THE PRESENT INVENTION

Figure 1:
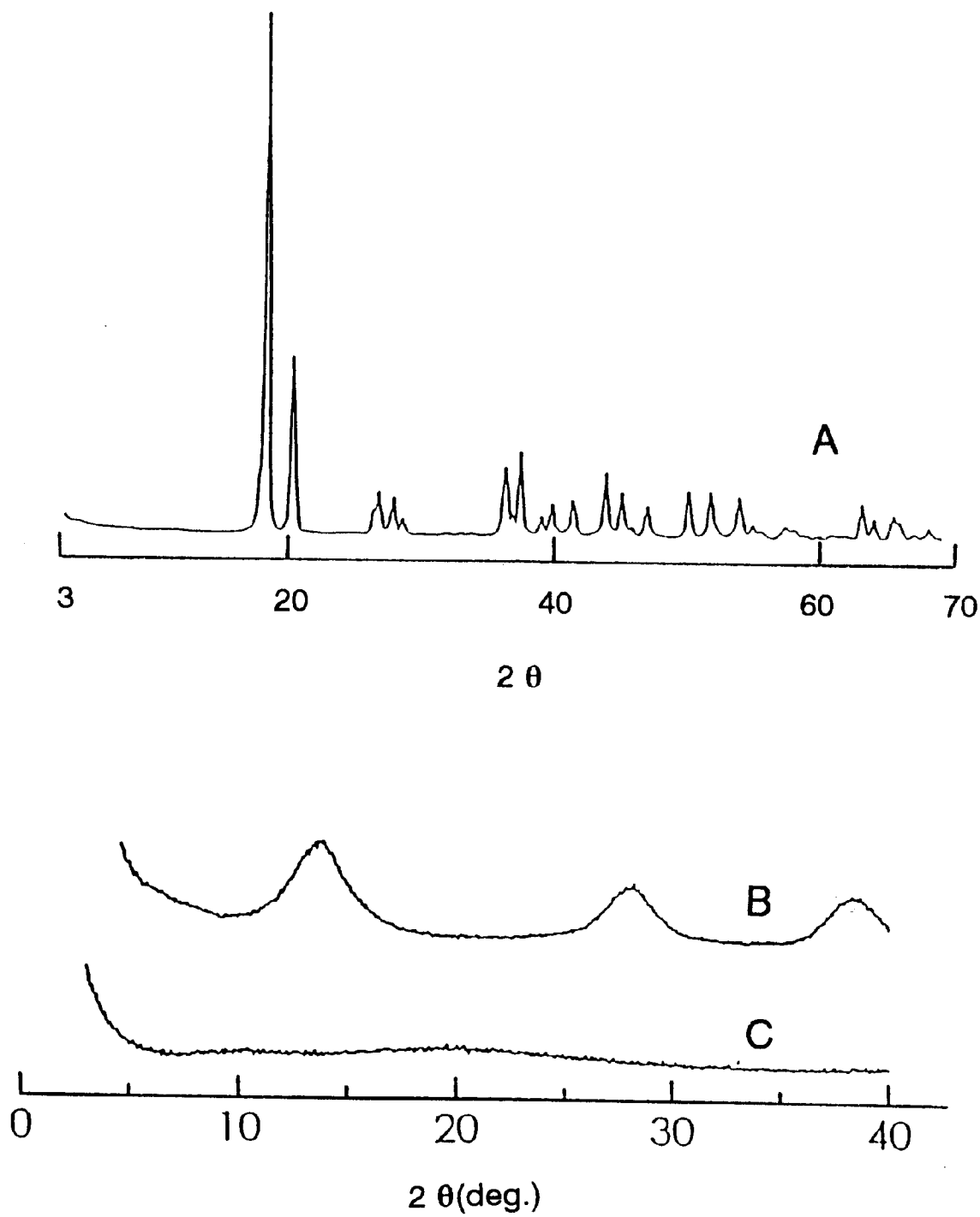
FIG. 1 is an X-ray diffraction pattern of hydrated alumina used as a starting material, wherein (A) is an X-ray diffraction pattern of a gibbsite-type of hydrated alumina, (B) is an X-ray diffraction pattern of pseudo-boehmite-type hydrated, alumina, and (C) is an X-ray diffraction pattern of amorphous hydrated alumina gel.

A Process for Producing an Alkali Aluminum Complex Hydroxide Carbonate Salt (1) A Hydrated Alumina Gel Method In the production method of this invention, the first characteristic is that amorphous or pseudo-boehmite type hydrated alumina gel is used as an aluminum component. By using the hydrated alumina gel, it is possible to maintain the concentration of $Al_2O_3$ in the reaction system at a higher level than when a water-soluble aluminum chloride is used, and the reaction can be carried out within a shorter period of time.

Hydrated alumina, generally called aluminum hydroxide, includes various known types such as gibbsite, boehmite and diaspore. In accordance with this synthesizing method, amorphous or pseudo-boehmite is selected, and used. Attached drawings, FIG. 1, (B) shows an X-ray diffraction pattern of pseudo-boehmite-type hydrated alumina gel, and (C) shows an X-ray diffraction pattern of amorphous hydrated alumina gel.

In this synthesizing method of this invention, this amorphous or pseudo-boehmite type hydrated alumina gel is reacted with an alkali metal carbonate salt or bicarbonate salt in an aqueous medium, and the second characteristic is that the concentration of alumina ($Al_2O_3$) becomes 1 to 5% by weight, and the pH at the end of termination of the reaction is maintained at 7 to 11. This increases the filtrability and washability with water of the resulting alkali aluminum complex hydroxide carbonate salt markedly. For example, as compared with the alkali aluminum complex hydroxide carbonate salt resulting from water-soluble aluminum salt as a starting material; in accordance with the synthesizing method of this invention, the filtration time can be shortened to about 1/10, and the required amount of water to be used can be saved to about 1/2.

The fact that an increase of the concentration of alumina results in increasing the filtrability of the resulting alkali aluminum complex hydroxide carbonate salt has been found as a phenomenon. Although the reason for increased filtrability of the resulting carbonate salt is never bound to the above fact, it is presumed that in the reaction system of the present invention, primary particles formed by the reaction of the above carbonate salt or bicarbonate salt grow to secondary particles having relatively large sizes, and this growth contributes to increased filtrability and washability. This agrees with the fact that stirring in the reaction system is easy despite a high solids concentration in the system.

The hydrated alumina used in this invention has an amorphous or pseudo-boehmite structure. This is considered to be closely related to a high reactivity. The gel is an assemblage of colloidal particles upon a loss of independency. Since these colloidal particles are in an amorphous state or in a condition near it, and since the gel is hydrated together with a sol which is independent as colloidal particles, it is belived that the hydrated alumina has very high reactivity. In addition, since the gel is an assembly of colloidal particles, even when the concentration of alumina in the reaction system is increased, it is considered that the viscosity in the liquid is lowered, and the stirring can be easily carried out advantageously.

The amorphous or pseudo-boehmite type hydrated alumina gel may be obtained by using aluminum chloride and aluminum nitrate as the aluminum salt. Preferably, aluminum sulfate or basic aluminum sulfate is reacted with sodium carbonate and/or sodium bicarbonate, especially sodium bicarbonate, for neutralization. The hydrated alumina so obtained has excellent actions mentioned above, and is especially excellent as a starting material of the alkali aluminum complex hydroxide carbonate salt of the present invention. Generally, by maintaining the pH during neutralization at 4 to 8, the amorphous or pseudo-boehamite type hydrated alumina gel is precipitated. It is filtered and washed with water and used as the starting material in this invention. In view of the filtrability and washability with water of the finally neutralized product, it is preferred that the reaction is carried out under heating at a temperature of 40 to 95° C., further in view of the heat decomposability of sodium carbonate and/or sodium bicarbonate, the reaction is carried out under heating at a temperature of 50 to 90° C. When basic aluminum sulfate is used as the starting material, the amount of sodium carbonate used for neutralization is small, and the process is advantageous beccause the presence of sodium sulfate is few. This basic sodium sulfate is obtained by adding calcium hydroxide to eliminate a part of the sulfuric acid radical from aluminum sulfate so that water-solubility may not be lost. The number of moles of the sulfuric acid radical is within a range of 0.9 to 3 per $Al_2$ atom.

It is important in this invention that the reaction is carried out so that the concentration of alumina ($Al_2O_3$) becomes 1 to 5% by weight, especially 1.5 to 4% by weight. When the concentration of alumina is lower than the above range, it tends to become difficult to obtain a product having good filtrability and washability with water. On the other hand, when the concentration exceeds the above range, the viscosity of the reaction system becomes too high and it is difficult to stir the reaction system whereby the uniformity of the reaction cannot be obtained.

It is also important that the reaction is carried out under such a condition that the pH at a time of termination of the reaction is maintained at 7 to 11, especially 8.5 to 10.5. If the pH is higher than the above range, the hydrated alumina gel is crystallized or the reactability with the alkali metal carbonate salt or bicarbonate salt is lowered. On the other hand, if the pH is lower than the above range, a carbonic acid ion can no longer exist stably in the system, and the reactability tends to be lowered.

The mole ratio of the amorphous or psedo-boehmite type hydrated alumina gel to the alkali metal carbonate salt or bicarbonate salt [$CO_3/Al$] is suitably at least 0.25, especially 0.25 to 4.

The suitable reaction temperature is in a range of 40 to 95° C., and the sufficient reaction time is about 1 to 12 hours. The addition sequence of the starting compounds is not particularly limited. The hydrated alumina gel and the carbonate salt or bicarbonate salt may be simultaneously poured to the reaction system, or the carbonate salt or bicarbonate salt may be added to the hydrated alumina gel, or they may be poured in a reverse sequence.

The resulting alkali aluminum complex hydroxide carbonate salt is separated from the reaction mother liquor by filtration, washed with water and dried to form a product. The resulting alkali aluminum complex hydroxide carbonate salt may be surface-treated with surface treating agents to be mentioned later in the reaction mother liquor.

The chacteristic of this invention is that when the alkali metal salt to be reacted with the amorphous or pseudo-boehmite type hydrated alumina is a conbination of sodium carbonate and lithium carbonate, an alkali aluminum complex hydroxide carbonate salt composed of a mixed crystal of LAHCS and dawsonite is obtained.

The alkali aluminum complex hydroxide carbonate salt crystal as formed contains about 0.5 to 3 moles (m) of water although varying depending upon the synthesis conditions. When this crystal is heated and dried at a temperature of 300° C. or below, the above crystal can be dehydrated partly or completely.

(2) Migration Method

According to the migration method of this invention, when gibbsite-type aluminum hydroxide as fine particles are reacted with a combination of a lithium compound and a carbonate salt capable of forming a lithium salt of carbonic acid or lithium carbonate in the presence of water, a lithium aluminum complex hydroxide carbonate salt will be produced.

FIG. 1, (A) shows an X-ray diffraction pattern of gibbsite-type hydrated alumina gel.

The lithium aluminum complex hydroxide salt (LAHS) results from migration of a lithium ion in the vacancy of an aluminum hydroxide octahedron layer having a gibbsite structure and inclusion of an anion to supply its charge. The lithium ion has the smallest ionic radius in the cation, and in addition, it is a 6-coordinate ion exceptionally as a monovalent ion. Therefore, it comes into the aforesaid vacancy and the LAHS takes the above-mentioned structure.

This reaction has the following characteristic. Namely, since an aluminum hydroxide used as a starting material has a gibbsite structure, an aluminum hydroxide is substantially kept insoluble in the reaction system. A lithium ion as another starting material migrates into a vacancy of an octahedron layer of the aluminum hydroxide. As the results, the gibbsite structure becomes a mother or template to synthesize LAHC.

Figure 3:
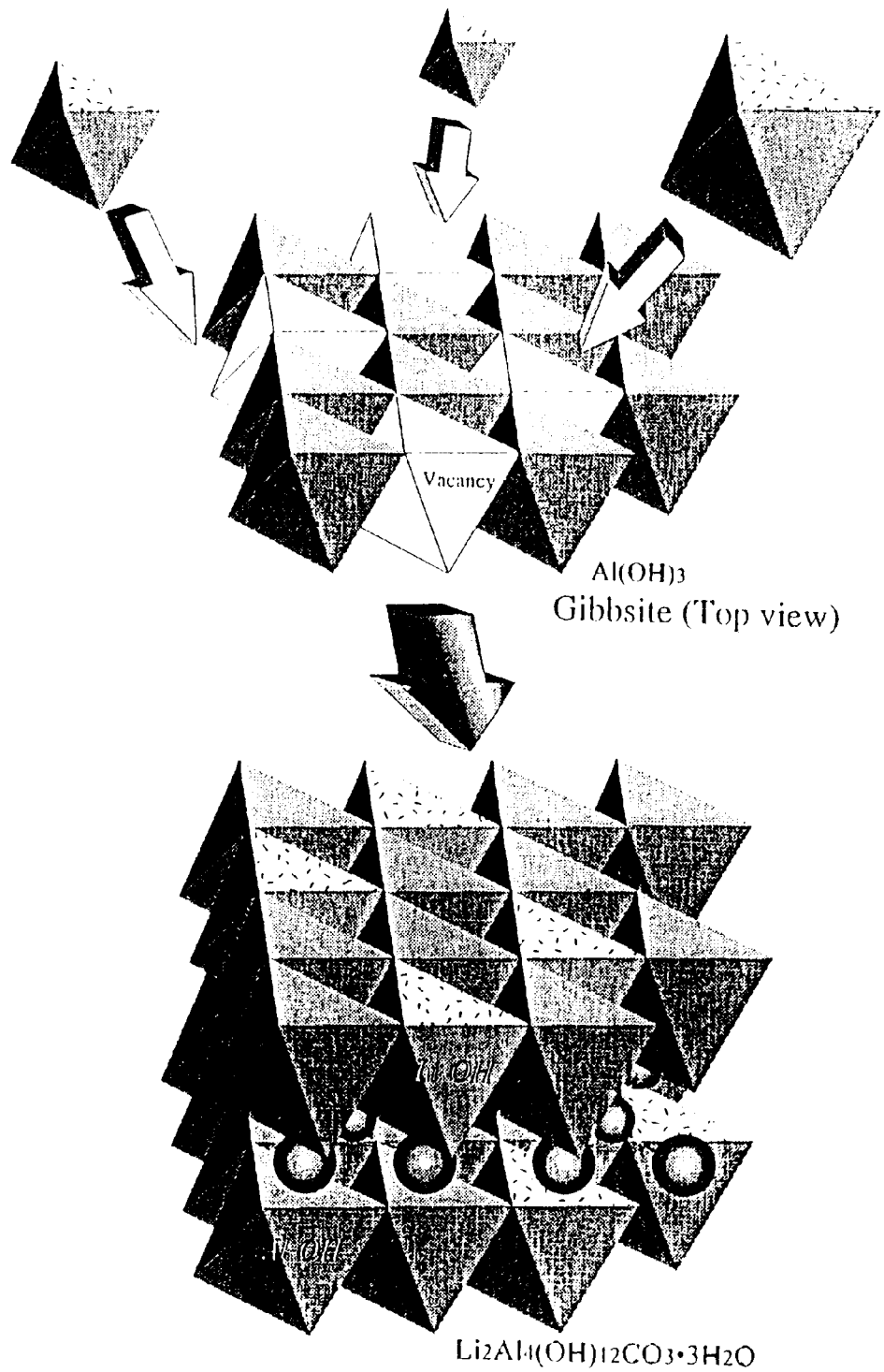
FIG. 3 is a model diagram of a migration reaction.

This reaction, the so-called migration reaction is shown in FIG. 3 as a model diagram. LiOH (the upper surface is shown by a hatch) migrates to the vacancy (vacancy . . . shown by white) of an $Al(OH)_3$ octahedron (shown by a shadow) of gibbsite and an interlayer carbonic acid anion (shown by a ball and stick) comes into the layers, where $Li_2Al_4(OH)_{12}CO_3.3H_2O$ is synthesized.

It is essential that the aluminum hydroxide used as a starting material of this invention should have a gibbsite-type crystal structure. It is important that the aluminum hydroxide is a fine particulate form with respect to a migration reaction. Preferably, this compound has an average particle diameter of generally 0.5 to 5 μm, especially 0.5 to 3 μm, and also has 2% by weight or below, especially 0% by weight or below, of coarse particles having a particle diameter of at least 20 μm. When the average particle diameter is larger than the above range, or the content of coarse particles is larger than the above range, the formation of LAHC by migration tends to be imperfect. On the other hand, if the particle diameter becomes too fine, the particles tend to become amorphous, and are unsuitable for the migration reaction.

Figure 2:
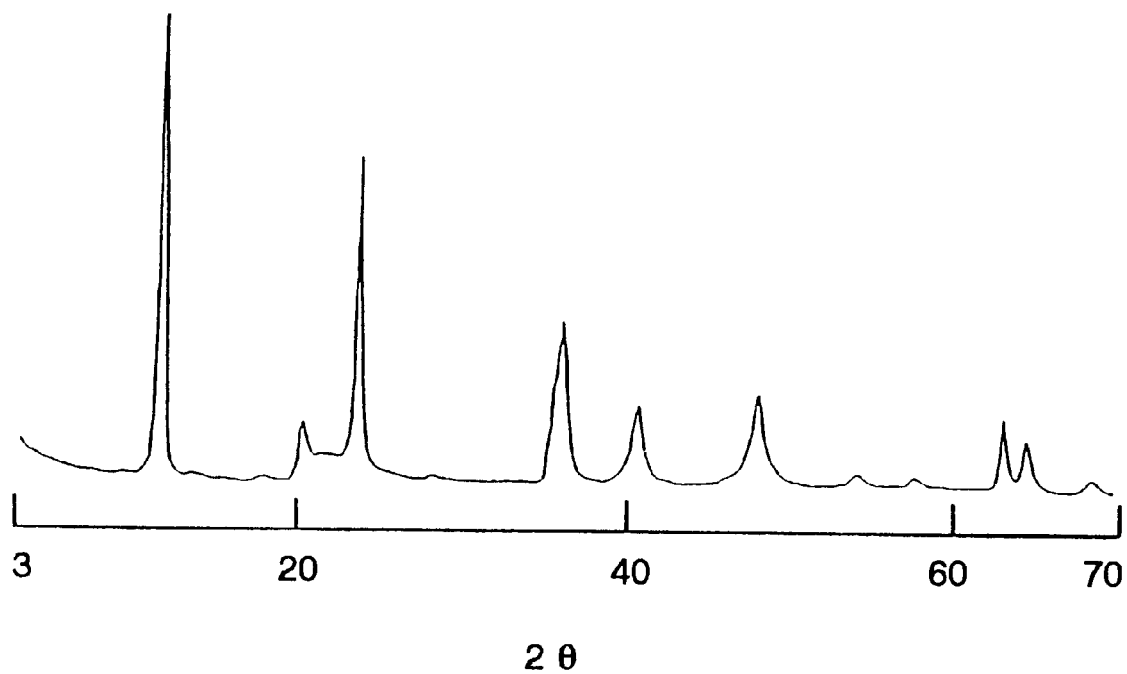
FIG. 2 is an X-ray diffraction pattern of LAHCS in accorance with a migration method of the present invention.

FIG. 2 shows an X-ray diffraction pattern of one example of the resulting lithium aluminum complex hydroxide carbonate salt. A comparison of FIG. 1,(A) (gibbsite) with FIG. 2 (LAHC) clearly shows that in LAHC, the peak of an index of a plane (002) migrates to a lower angle side and the spacing increases, namely the carbonic acid radical is introduced between basic layers.

In carrying out the reaction, temperatures required for migrating of a lithium ion to the cacancy of the aluminum hydroxide octahedron layer are necessary. Reaction temperatures of generally at least 70° C., especially 80 to 130° C., are desirable. On the other hand, the pH of the reaction system should not substantially dissolve the gibbsite-type aluminum hydroxide. Suitably, it is from 9 to 13.

In the method of this invention, the synthesis can be performed while the concentration of the solid content in the reaction system is maintained at a high concentration of 10 to 20% by weight, and this brings about much advantage.

The gibbsite-type aluminum hydroxide as fine particles used as the starting material in this invention are easily available as a commercial synthetic product, for example hizilite, manufactured by Showa Denko Co., Ltd.

The gibbsite-type aluminum hydroxide desirably possesses the aforesaid particle characteristics, but even if it has particle characteristics outside the above range, its particle characteristics are adjusted to the above range by wet pulverization and can be used in the reaction of this invention.

Other starting materials may include a combination of a lithium compound and a carbonic acid salt capable of forming a lithium salt of carbonic acid or lithium carbonate.

Examples of the lithium salt of carbonic acid include lithium carbonate, lithium bicarbonate, and a mixture of these compounds. Lithium carbonate is best suited as the starting material because it does not give salts of lithium carbonate as by-products.

Instead of using a lithium salt of carbonic acid, a combination of a lithium compound capable of forming a carbonic acid ion and a lithium ion and a carbonic acid salt may be used. As the lithium compound, water-soluble lithium compounds such as lithium hydroxide, lithium chloride and lithium nitrate may be used. As the carbonic acid salt, sodium carbonate, potassium carbonate and sodium bicarbonate may be used.

In the method of this invention, the lithium-type starting material may be used in an equivalent weight or more based on the gibbsite-type aluminum hydroxide. Since generally the efficiency of the reaction is good, it may be used in an equivalent weight or a slightly excessive amount to the equivalent weight.

In performing the reaction, the gibbsite-type aluminum hydroxide and the lithium-type starting material in the form of a solution may be contacted in the presence of water. At this time, there is no particular restriction in the order of adding the starting material. The lithium starting material in the form of a solution or a solid may be added to an aqueous suspension of aluminum hydroxide. Or conversely, aluminum hydroxide may be added to a solution of the lithium starting material. Or aluminum hydroxide and the lithium starting material may be simultaneously poured in an aqueous medium.

The reaction can be carried out in an aqueous medium whose solids concentration is relatively thin. One advantage of the migration method of this invention is that the synthesis can be performed in a high concentration such as a solids concentration of, for example, 10 to 20% by weight. LAHC can be synthesized with good efficiency by using a reaction vessel of a relatively small volume.

Preferably, the reaction is carreid out with stirring generally at least 70° C., especially 80 to 130° C. There is no particular restriction in the reaction pressure. Generally, the reaction at atmospheric pressure is sufficient. However, when the temperature exceeds 100° C., the reaction may be carried out under an elevated pressure such as an autogenous pressure.

The reaction time varies depending upon the reaction temperature, but generally it may be 1 to 10 hours. LAHC can be synthesized within a relatively short period of time.

In the method of this invention, anions other than a carbonic acid radical derived from water-soluble lithium compounds, such as a chlorine ion and a nitric acid ion, may co-exist. However, since in this case, a carbonic acid ion is taken preferentially into the lithium aluminum complex hydroxide, no particular problem arises. The carbonic acid anion in LAHC desirably occupies at least 50 mole %, especially at least 80 mole %, based on the total anions.

After the end of the reaction, the resulting LAHC is subjected to a solid-liquid separating procedure such as filtration, decantation and centrifugal separation, and as required, washed with water and dried to give a final product. When lithium carbonate is used as the lithium starting material, since there is no coexistence of a different kind of ion, the step of washing the product with water can be omitted.

In order to modify the properties of the surface of the resulting LAHC, a higher fatty acid or a surface-active agent is added to the reaction product containing LAHC and then LAHC is treated with stirring.

Alkali Aluminum Complex Hydroxide Carbonate Salt

According to this invention, the above process gives an alkali aluminum complex hydroxide carbonate salt having a unique crystal structure and extremely little alkali metal components as impurities. It has been found that this product has excellent dispersibility in resins, and when the above product is compounded in the resins, an effect of a very little tendency to deteriorate the resins can be obtained.

(1) Lithium Aluminum Complex Hydroxide Carbonate Salt (LAHCS)

LAHCS is obtained by entering a lithium ion into the vacancy of an aluminum hydroxide octahedoral layer having a gibbsite structure, and taking up an anion to make up for its charge. The lithium ion has the smallest ionic radius among cations, and since as a monovalent ion, it is exceptionally a 6-coordinate ion, and this monovalent ion enters in the above vacancy to take up the above structure.

Since LAHCS has a layered structure, exhibits ion exchangeability with respect to the anion, and shows a structure and characteristics similar to hydrotalcite, it is called a hydrotalcite-like compound or lithium hydrotalcite. However, LAHCS is quite different from hydrotalcite in chemical commposition and structure because hydrotalcite is obtained by isomorphous-substituting a part of magnesium of the brucite structure with aluminum.

LAHCS generally has an X-ray diffraction pattern mentioned above. The lithium aluminum complex hydroxide carbonate salt (LAHCS) according to this invention, whether by the hydrated alumina gel method or the migration method, is markedly characterized by a lamination asymmetry index (Is) defined by (1) of not larger than 1.0, especially 0.5 to 1.0, at a peak of an index of a plane (016) and not larger than 1.0, especially 0.5 to 1.0, at a peak of an index of a plane (017).

Figure 4:
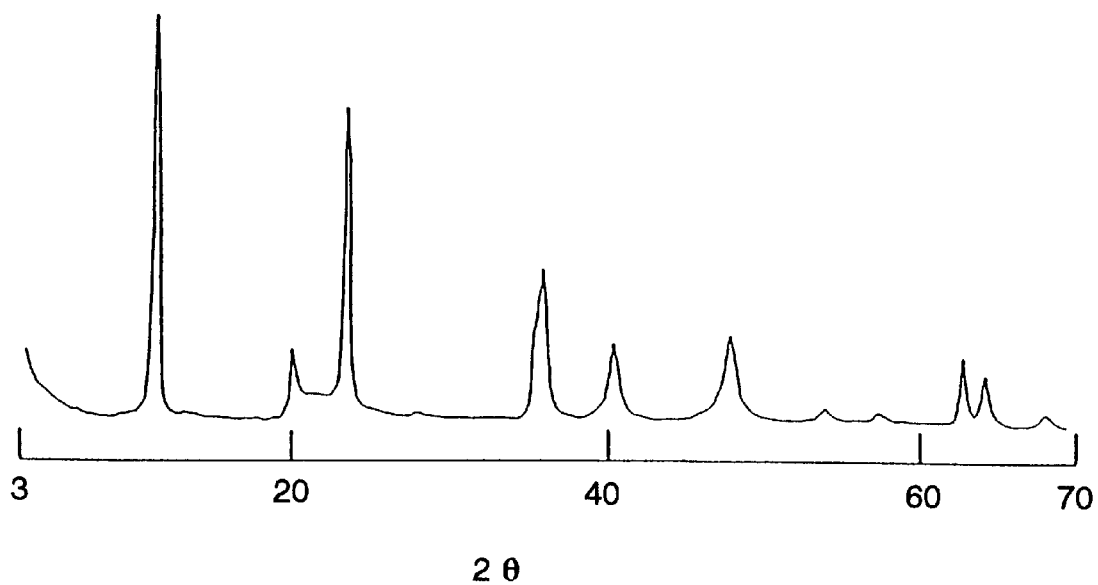
FIG. 4 is an X-ray diffraction pattern of a lithium aluminum complex hydroxide carbonate salt (LAHCS) according to the production method of this invention.
Figure 5:
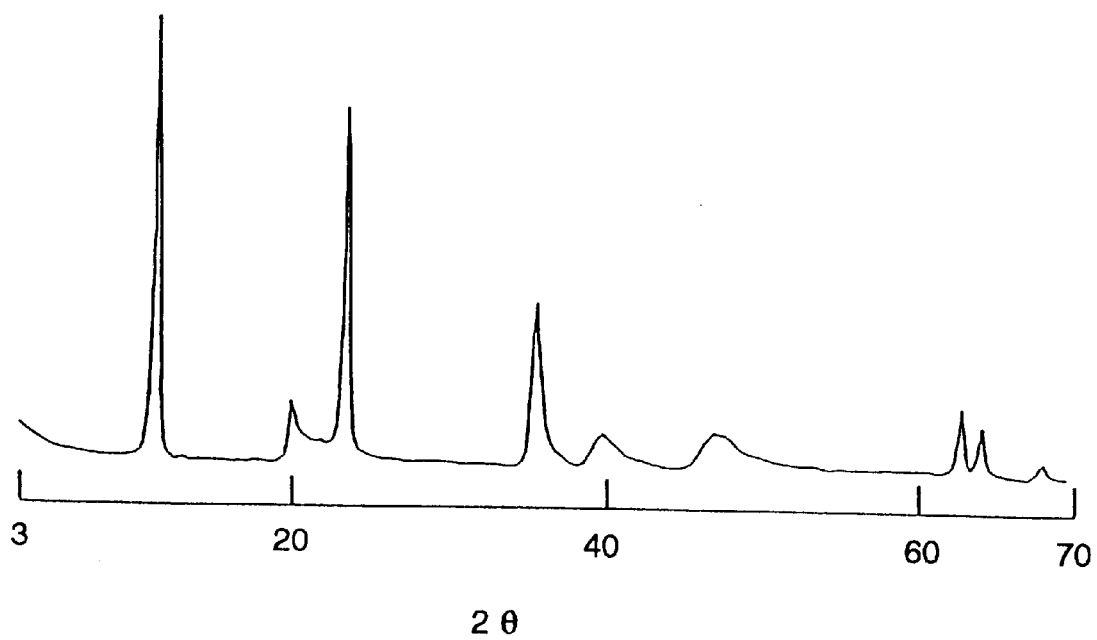
FIG. 5 is an X-ray diffraction pattern of a lithium aluminum complex hydroxide carbonate salt according to a conventional co-precipitating method.
Figure 6:
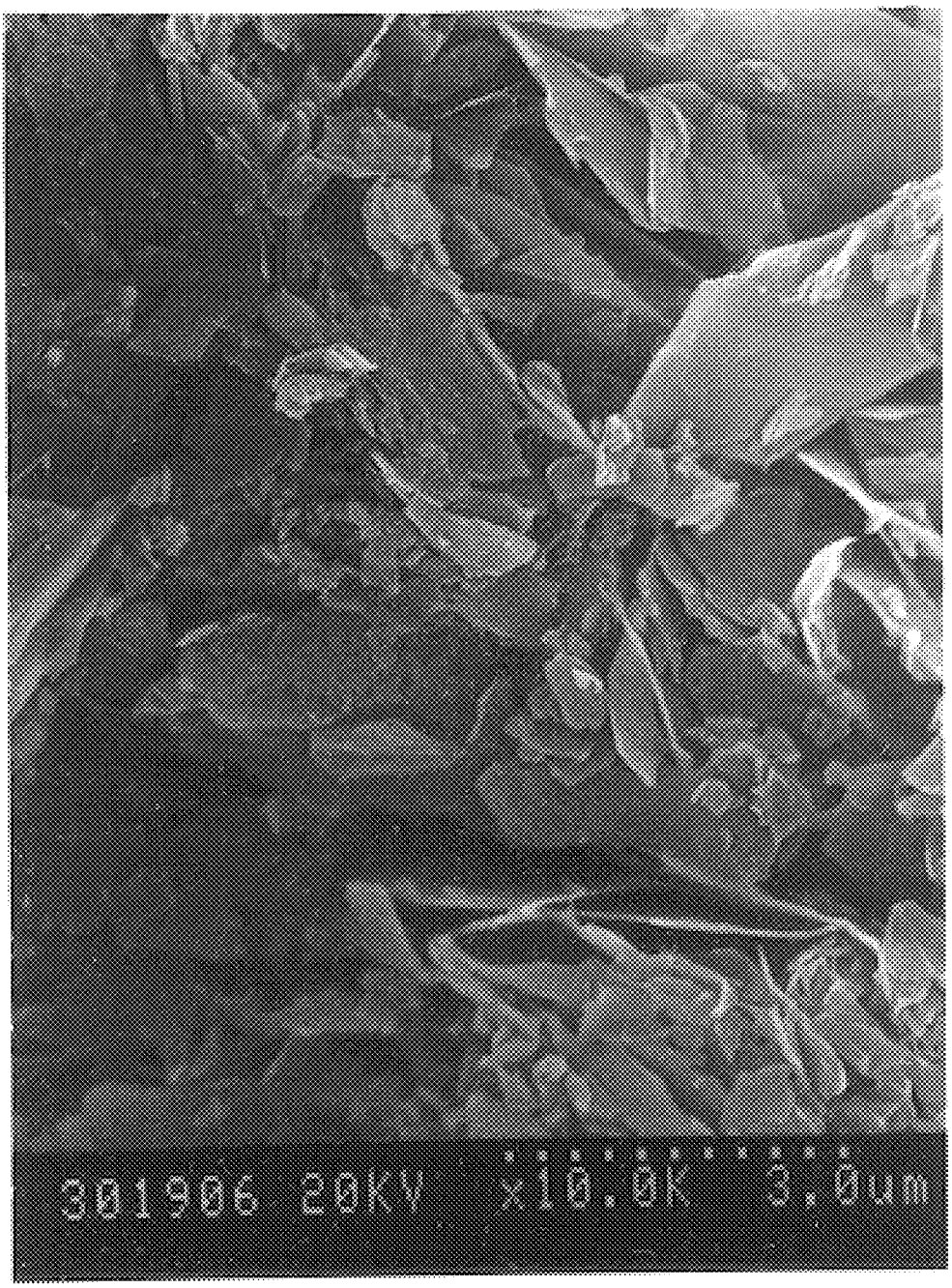
FIG. 6 is a scanning-type electron microscopic photograph showing a particle structure of a lithium aluminum complex hydroxide salt according to the production method described in the literature reference of I. Sissoko et al. in Comparative Example 6.

FIG. 4 is an X-ray diffraction pattern of LAHCS according to the process of this invention in which the alumina starting material is amorphous or pseudo-boehmite-type hydrated alumina. FIG. 5 represents an X-ray diffraction pattern of LAHS according to a conventional co-precipitation method. A comparison of FIG. 4 and FIG. 5 shows the fact that with LAHCS according to the conventional co-precipitation method, peaks of an index of a plane (016) and an index of a plane (017) are broad and small and have a broad tailing on a broad angle side, whereas with LAHCS according to the synthetic method of this invention, peaks of an index of a plane (016) and an index of a plane (017) become sharp and high, the aforesaid tailing on a broad angle side disappears and the peaks become a nearly symmetrical shape with respect to a peak perpendicular.

Figure 7:
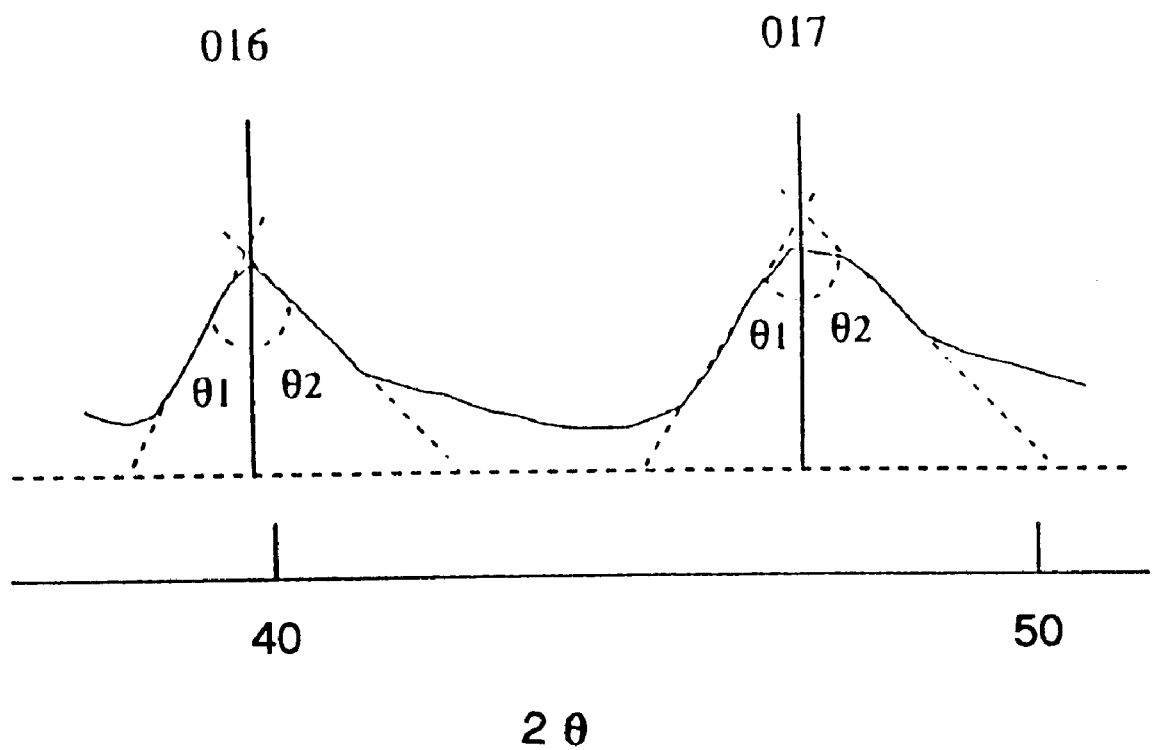
FIG. 7 shows enlarged views of peaks of indices of a plane (016) and (017) indicating an X-ray diffrraction pattern of a lithium aluminum complex hydroxide carbonate salt, which also show a method of seeking a laminated asymmetry index.

In FIG. 7 showing a method of seeking the lamination asymmetry index (Is) from the X-ray diffraction patterns of FIGS. 4 and 5, the peaks of an index of a plane (016) and an index of a plane (017) are magnified, and with respect to these peaks, a narrow angle maximum inclination peak tangent a and a broard angle maximum inclination peak tangent b of the peaks are drawn, and a perpendicular c is drawn from a point of intersection between the tangent a and b. Then, an angle $\theta_1$ between the tangent a and the perpendicular c and an angle $\theta_2$ between the tangent b and the perpendicular c are sought. The lamination asymmetry index (Is) is sought as a value of Is=tan $\theta_2$/tan $\theta_1$ ... (7). This index (Is) is 1.0 when the peak is completely symmetrical, and is a larger value when the degree of symmetry increases.

With LAHS according to the co-precipitation method, Is values of indexes of planes (016) and (017) are 2.3 and 1.6 respectively, whereas with LAHCS according to the migration method, Is values are 1.0 or less.

This shows that with LAHCS of the present invention, aluminum hydroxide octahedral basic layers in which a lithium ion is incorporated form a laminated structure in which the basic layers are laminated in the direction of C axis. By the conventional co-precipitation method, the basic layers are each shifted in four directions (front, behind, right, left) as seen in the direction of the c axis, and the sizes of the basic layers are decreased.

On the other hand, in LAHCS according to the hydrated alumina gel method, the basic layers are almost over-laped and piled in four directions, and the sizes of the basic layers are large and approximately constant.

The bulk density of LAHCS of this invention is 0.1 to 0.35 g/cm$^3$, especially 0.25 to 0.35 g/cm$^3$, as measured by JIS K6721.

The conventional LAHS shows a BET specific surface area of generally 10 to 40 m$^2$/g, whereas LAHCS of the present invention has a BET specific surface area of 40 to 70 m$^2$/g.

The amount of an oil absorbed is as small as 40 to 70 ml/100 g. The above LAHCS has excellent compounding property in resins or paints.

The LAHCS of the present invention has an orientation degree, defined by the following formula (8)

$$OD = I(002)/I(110) \qquad (8)$$

wherein I (002) represents a relative intensity of an X-ray diffraction (Cu-Kα) peak appearing at an index of a plane (002) at a spacing (d) of 7.67 to 7.84 Å, and I (110) represents a relative intensity of an X-ray diffraction (Cu-Kα) peak appearing at an index of a plane (110) at a spacing (d) of 4.41 to 4.45 Å, of smaller than 10 and differs from the orientation degree of at least 10 assigned to LAHCS proposed by the present inventors before.

LAHCS of the present invention has a pigment volume concentration of 40 to 50%. Since generally PVC of a pigment has a pigment volume concentration of 30 to 70%, it can be said that the LAHCS of this invention has excellent pigmentability.

The pigment volume concentration is a value defined by the following formula (9).

$$\text{Pigment volume concentration: } PVC = \frac{100 B\rho}{B\rho + 0.01 Or \cdot P\rho} \qquad (9)$$

Or: The amount of an oil absorbed in the pigment (ml/100 g)

Bρ: The density of the resin (g/cm$^3$)

Pρ: The density of the pigment (g/cm$^3$)

That the pigment volume concentration is high shows that the large amount can be compounded in the coating agent. And also, it shows that in uses as a resin compounding agent, the filling property and pigmentability are good, and it is advantageous that the compounding in the resin is easy.

Furthermore, LAHCS of the present invention, when formed as an aqueous slurry having a concentration of 5% by weight, has a specific resistance of at least 8000 Ω·cm, especially at least 10000 Ω·cm. Thus, the deterioration of the resin by alkali metal components is markedly suppressed. This fact will become clear by referring to the following example.

Figure 8:
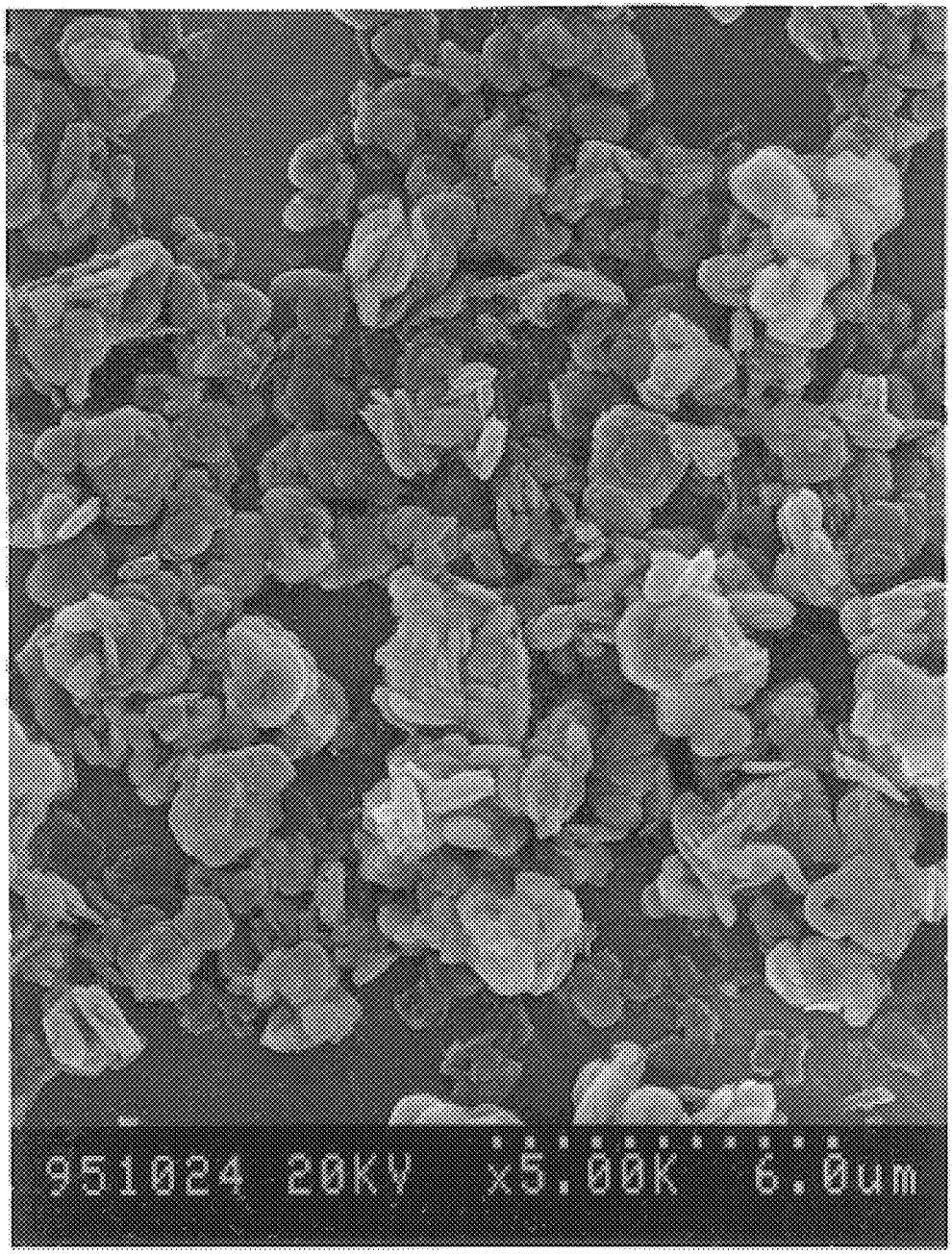
FIG. 8 is a scanning-type electron microscopic photograph showing a particle structure of LAHCS at a magnification of 5000 times in accordance with a migration method of the present invention.
Figure 9:
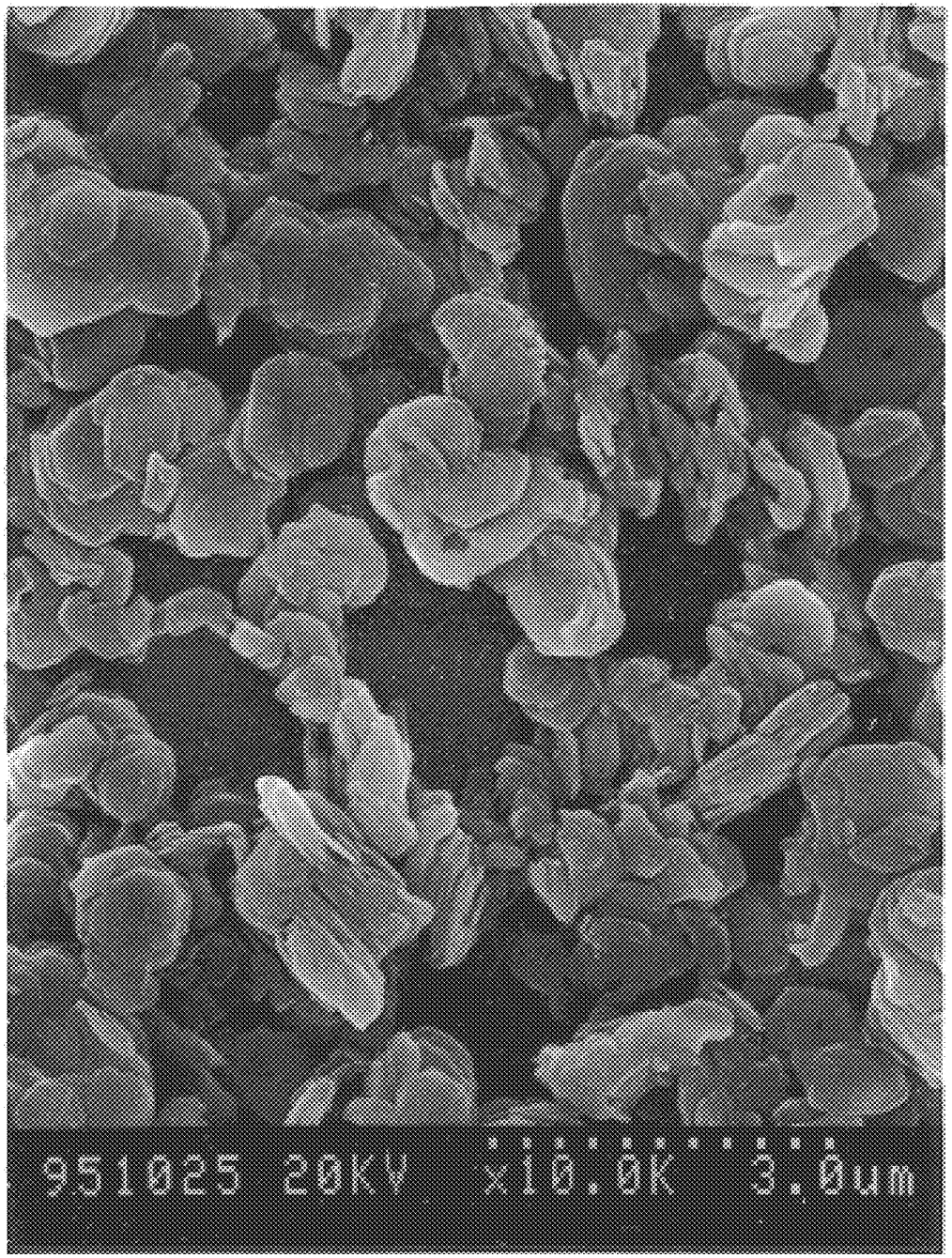
FIG. 9 is an electron microscopic photograph showing a particle structure of LAHCS at a magnification of 10000 times in accordance with a migration method of the present invention.

FIGS. 8 (a magnification of 5000 times) and 9 (a magnification of 10000 times) show electron microscopic photographs of one example of LAHCS according to the migration method in accordance with this invention. These photographs show that LAHCS of the migration method of this invention has the same hexagonal plate-like particle shape as the LAHCS having a high orientation degree which the present inventor previously proposed, but the thickness of the particles increase as compared with the gibbsite particles used as the starting material.

Furthermore, these particles have a median diameter ($D_{50}$), based on volume standard, of generally 0.2 to 10 μm, especially 0.5 to 6 μm, as measured by a laser scattering diffraction method.

Figure 10:
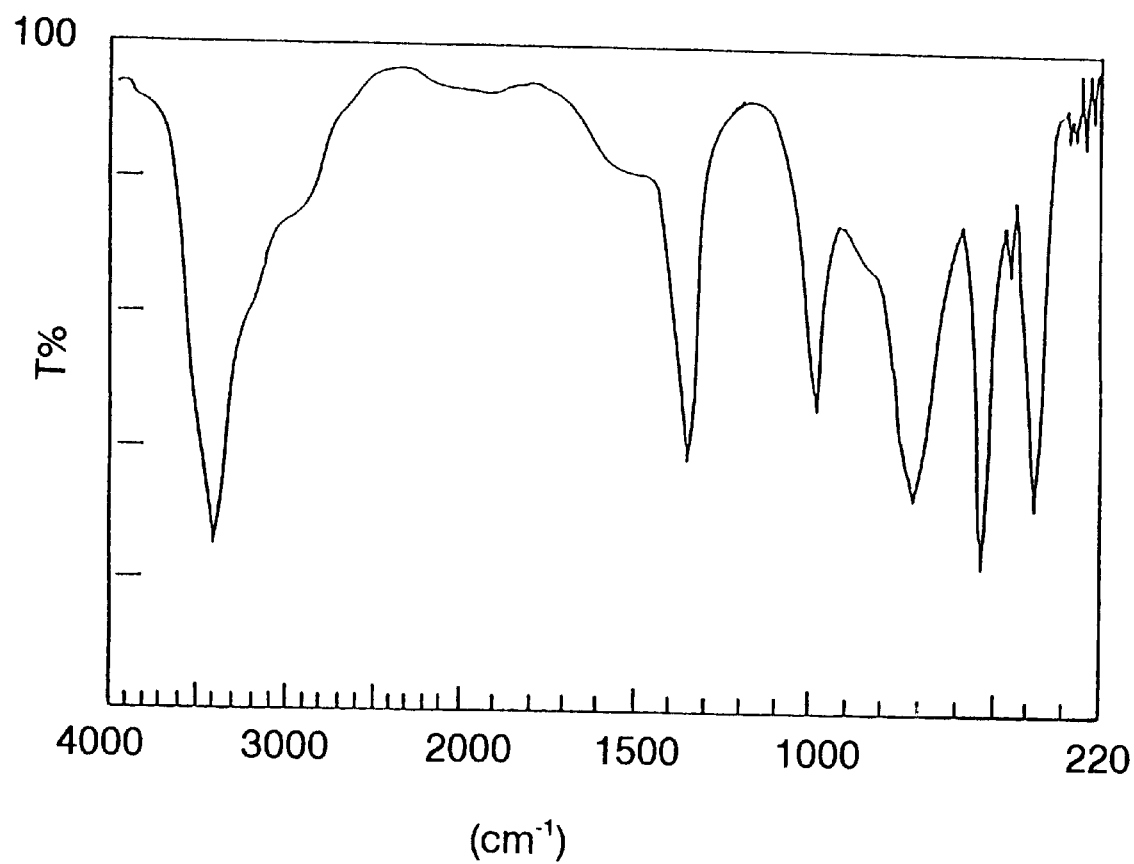
FIG. 10 is an infrared absorption spectrum chart of LAHCS in accordance with a migration method of the present invention.

FIG. 10 shows an infrared absorption spectrum of the migration method of LAHCS prepared by the migration method. As is clear from FIG. 10, this LAHCS has a large infrared absorption spectrum at wave numbers of 547, 735,1004, 1375, and 3443 ($cm^{-1}$), and is useful as an agricultural film, especially a warmth-keeping agent (infrared absorbing agent) of films for greenhouses.

Figure 11:
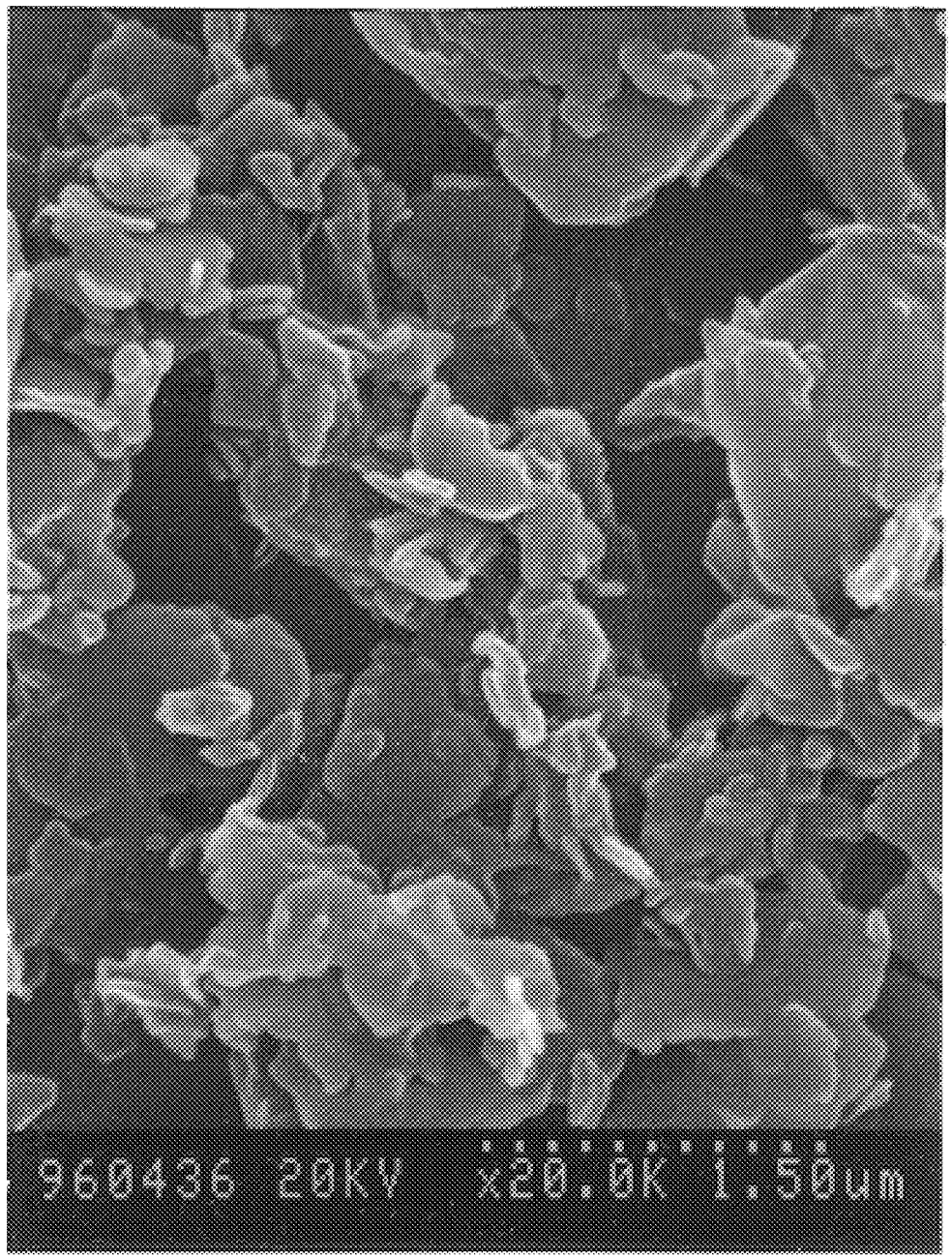
FIG. 11 is a scanning-type electron microscopic photograph showing a particle structure of a lithium aluminum complex hydroxide carbonate salt (LAHCS) according to Example 5 of the present invention.

FIG. 11 is a scanning-type electron microscopic photograph showing the particle structure of the lithium aluminum complex hydroxide carbonate salt (LAHCS) of a lithium aluminum complex type according to the hydrated alumina gel method (Example 5 of this invention).

Furthermore, these particles have a median diameter ($D_{50}$) based on volume standard, measured by a laser scattering diffraction method, of generally 0.1 to 10 μm, especially 0.1 to 3 μm.

(2) Sodium Aluminum Complex Hydroxide Carbonate Salt (NAHCS)

The present inventors have found that when dawsonite which is a known sodium aluminum basic carbonate salt mineral (basic aluminum carbonate complex salt) is compounded in a film-forming resin, a combination of excellent warmth-keeping property and transparency can be achieved, and the compoundability in the film or the properties of the compounded film are excellent.

Figure 12:
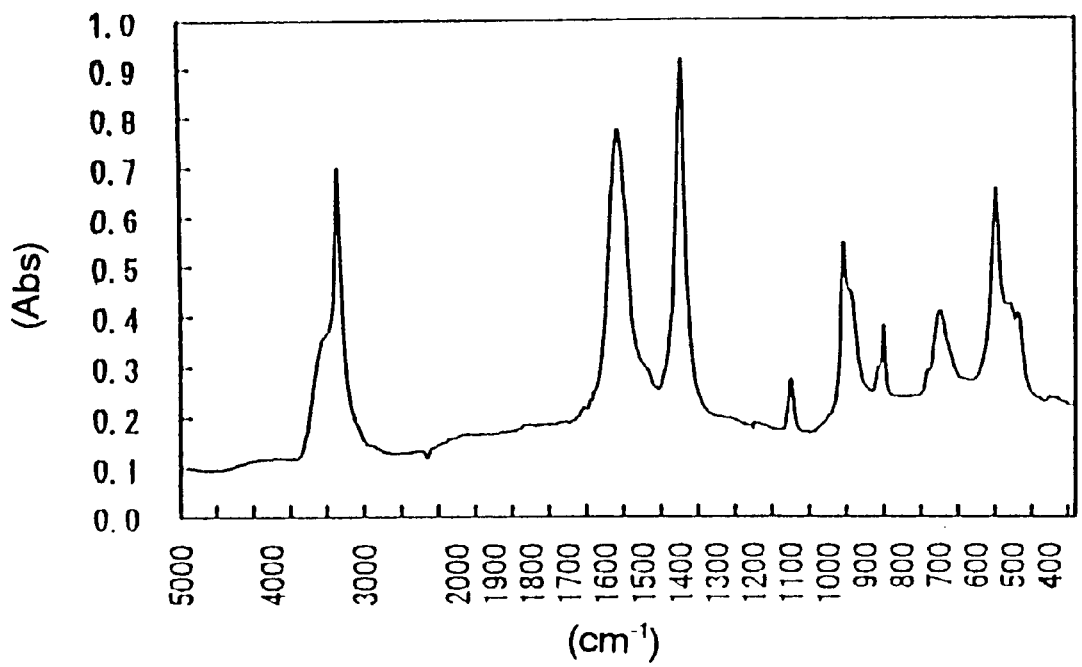
FIG. 12 is an infrared absorption spectrum chart showing dawsonite used in Example 11 of the present invention.
Figure 13:
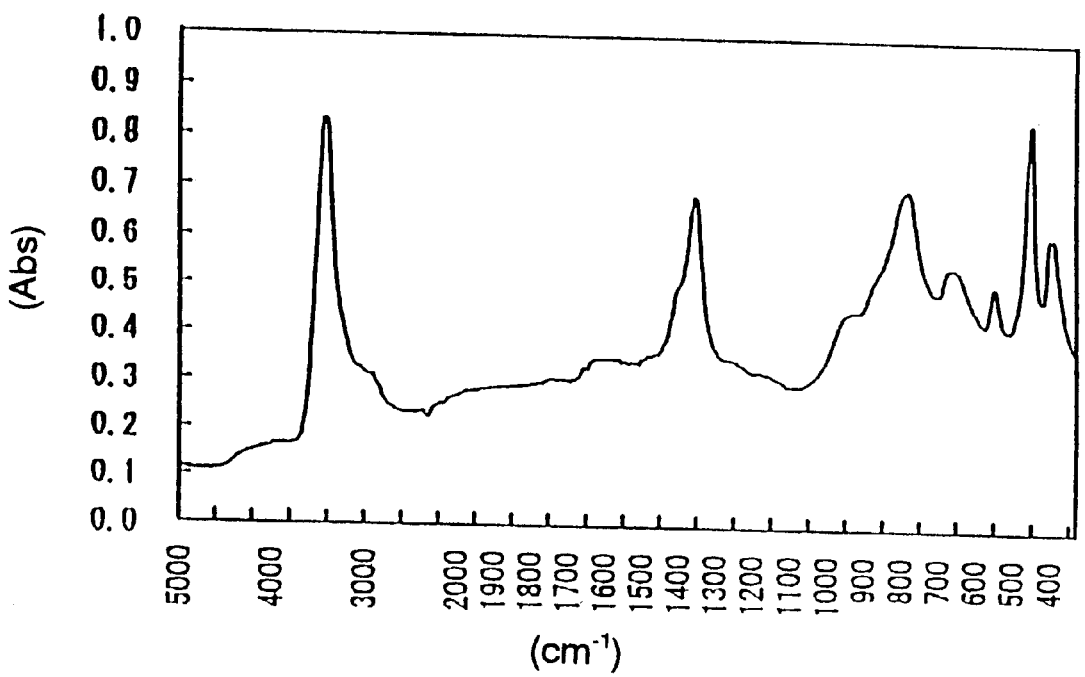
FIG. 13 is an infrared absorption spectrum chart showing hydrotalcite obtained in Comparative Example 8.

FIGS. 12 and 13 respectively show infrared absorption spectra of dawsonite (Example 12) used in this invention and hydrotalcite (Comparative Example 8) used conventionally as a resin warmth-keeping agent. According to these infrared absorption spectra, dawsonite (FIG. 12) shows a spectrum near hydrotalcite (FIG. 13), but at wave numbers of 1500 to 1600 (wavelengths of 0.62 to 0.66 μm), dawsonite shows large absorptions not observed in the hydrotalcite and clearly has excellent heat absorbability.

It has also been found that dawsonite, in a thermogravimetrc analysis, substantially has no weight loss at a temperature of 300° C. or below, and at the time of kneading or molding the resin, it is preferable to prevent foaming.

Figure 14:
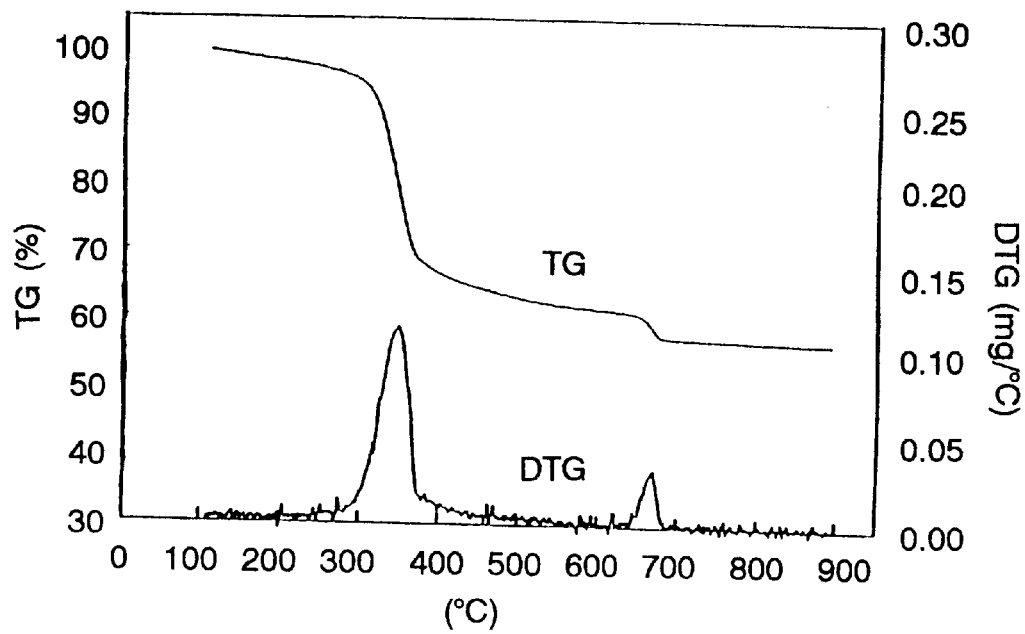
FIG. 14 is a differential thermal analysis curve of dawsonite used in Example 11 of the present invention.

FIG. 14 is a thermogravimetric analysis curve of dawsonite used in this invention. The diagram in an upper side is an accumulation curve, and the diagram in a lower side is a differential curve. The results show a surprising fact that the dawsonite used in this invention has a hydrated water, but substantially gives no weight loss at room temperature to 300° C. which exceeds the processing temperature of the resin, and therefore, a decrease in transparency or a decrease in the properties of a film is hardly developed by foaming which becomes a hazard at the time of processing the resin.

Dawsonite obtained by a known production method has a fibrous shape. It has a fiber diameter of 0.01 to 1 μm, especially 0.01 to 0.5 μm, and an aspect ratio of 1 to 100, especially 1 to 20 which does no hamper compoundability in resins with respect to resin compositions which attach much importance to transparency, and the transmittance of the compounded resin becomes preferable.

NAHCS according to the hydrated alumina gel method of this invention has a dawsonite-type crystal structure, but possesses a unique crystal structure.

The dawsonite-type crystal structure has the substantially same X-ray diffraction pattern as shown in Table 2 below in an X-ray diffraction using Cu-α.

TABLE 2

| Spacing (Å) | Relative intensity |
|---|---|
| 5.7 | vs |
| 3.38 | m |
| 3.02 | m |
| 2.78 | S |
| 2.61 | m |
| 2.5 | w |
| 2.15 | w |
| 1.99 | m |
| 1.73 | w |
| 1.69 | m |

In the table, VS represents very strong, S represents strong, m represents moderately strong and w represents weak.

Figure 15:
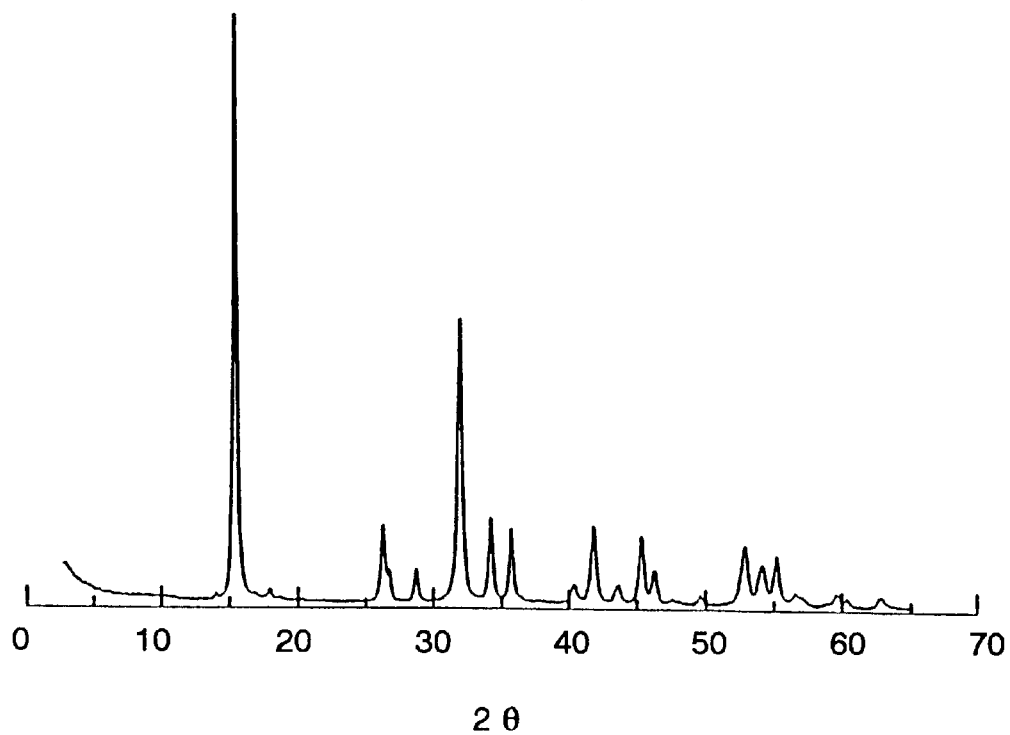
FIG. 15 is an X-ray diffraction pattern of a sodium aluminum complex hydroxide carbonate salt (dawsonite) in accordance with a conventional method (Example 11).
Figure 16:
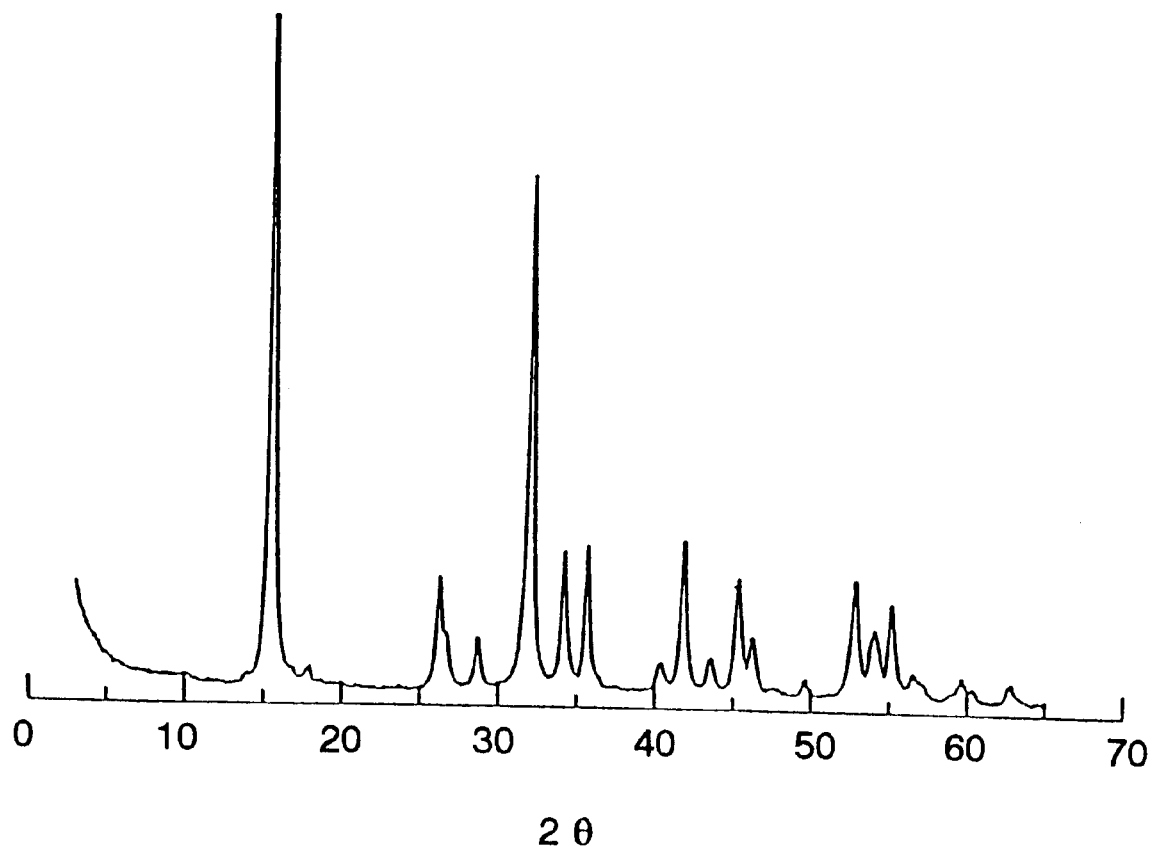
FIG. 16 is an X-ray diffraction pattern of a dawsonite-type sodium aluminum complex hydroxide carbonate salt (NAHCS) in accordance with Example 7.

The half value width of a peak of an index of a plane (011) in an X-ray diffraction pattern in Cu-α is 0.2° or below in the dawsonite according to the conventional production process, but the dawsonite of the present invention has a half value width of a peak of an index of a plane (011) in an X-ray diffraction pattern in Cu-α of at least 0.4°, especially 0.45 to 0.75°. The attached FIG. 15 shows an X-ray diffraction pattern of dawsonite according to the conventional method, and FIG. 16 shows an X-ray diffraction pattern of dawsonite according to this invention.

In an X-ray diffraction pattern of crystal, it is known that when the following Bragg formula (10)

$$n\lambda = 2d_{nkl} \sin \theta \qquad (10)$$

wherein n is an degree, λ is a wavelength of the X-ray, $d_{hkl}$ is a spacing of (nkl) of a crystal, and θ is a diffraction angle, is satisfied, an intensity peak appears in the interference. Between the sharpness of an interference peak and the size of the crystal, the relation of the following Scherrer formula (11)

$$L_{nkl} = K\lambda / H \cos \theta \qquad (11)$$

wherein $L_{hkl}$ is the size in a perpendicular direction to the (hkl) surface of the crystal, K is a constant of about 0.9, H is a half value width (radian) of the interference peak, and λ and θ are the same as in formula (10), is established.

That in NAHCS of this invention, the half value width of a peak of an index of a plane (011) is large shows that the size of the crystal in a b axis direction is small.

Figure 17:
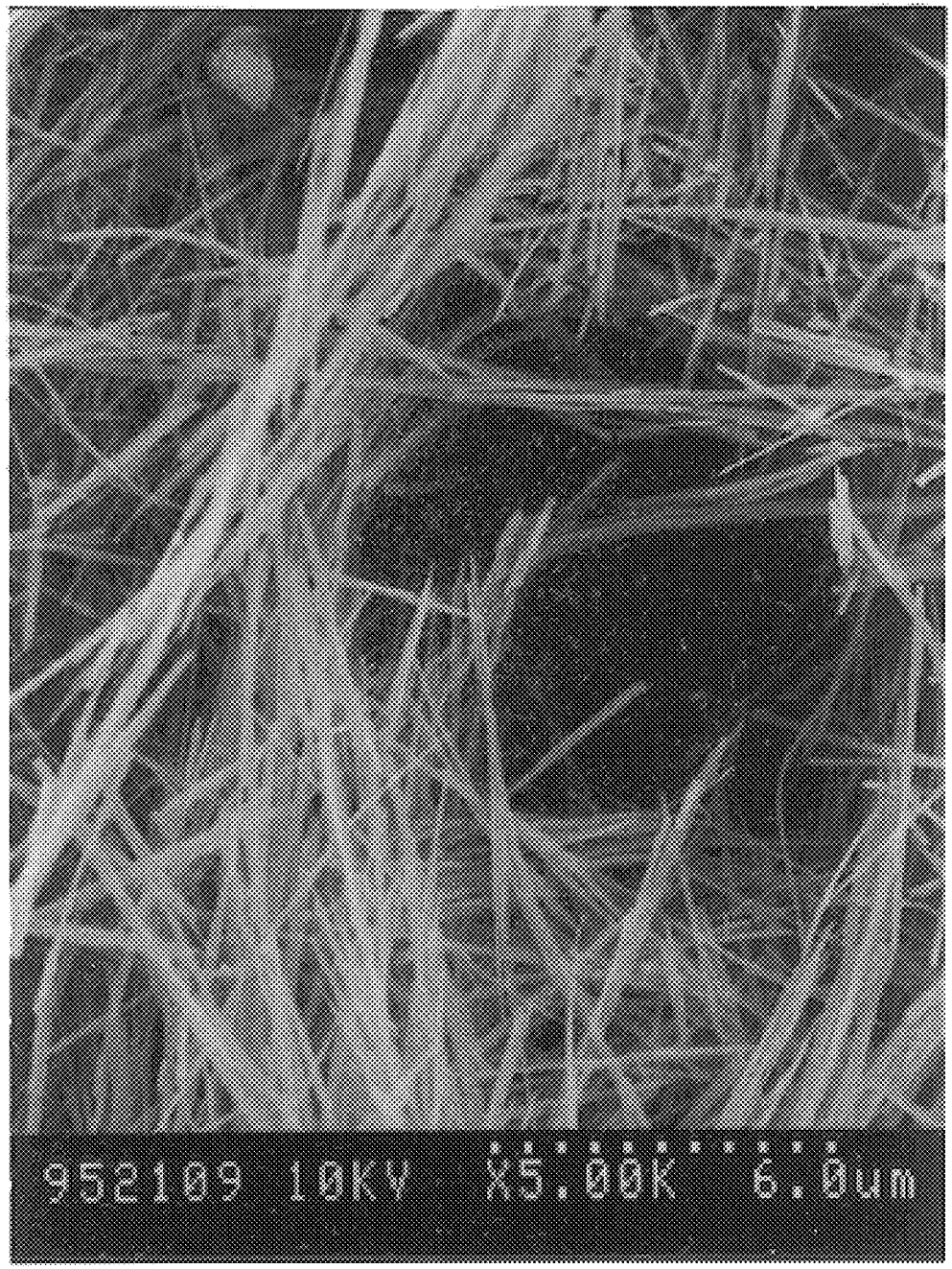
FIG. 17 is a scanning-type electron microscopic photograph showing a particle structure of a sodium aluminum complex hydroxide carbonate salt (dawsonite) in accordance with a conventional method (Example 11).
Figure 18:
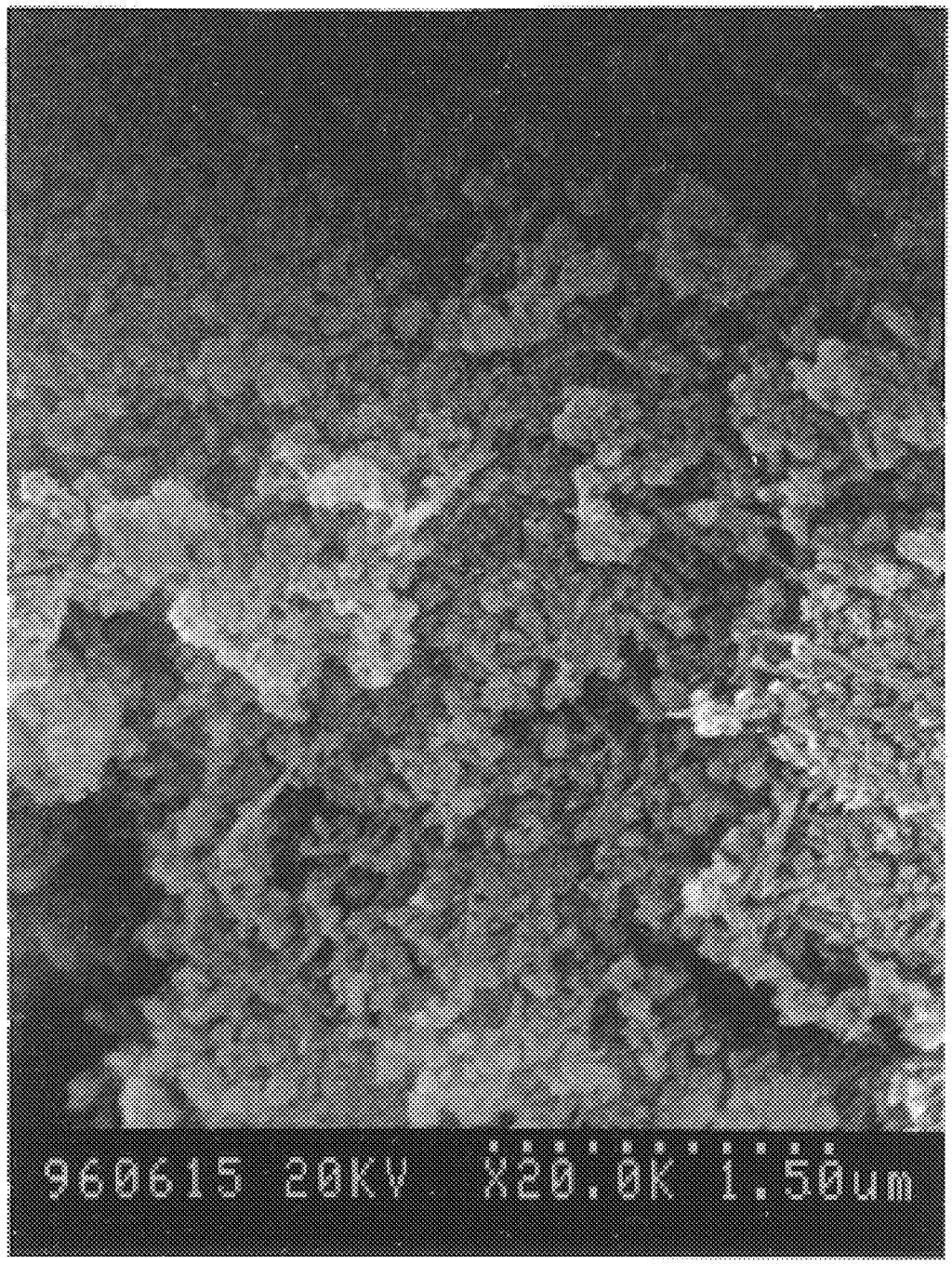
FIG. 18 is a scanning-type electron microscopic photograph showing a particle structure of a dawsonite-type sodium aluminum complex hydroxide carbonate salt (NAHCS) according to Example 7 of this invention.

FIG. 17 indicates a scanning-type electron microscopic photograph (a magnification 5000 times) showing a particle structure of dawsonite according to a conventional method, and FIG. 18 represents a scanning-type electron microscopic photograph showing a particle structure of dawsonite produced by the hydrated alumina gel method of this invention. These scanning-type electron microscopic photographs show that the conventional dawsonite is obtained by entangling bundles of fine fibers having an extremely large aspect ratio whereby coarse thread ball-like secondary particles are bound, but in the dawsonite of this invention, the degree of growth of a fibrous structure is very small, and the secondary particles can be a particle shape having a small degree of agglomeration.

With regard to the particle shape, the former has a relatively large amount of an oil absorbed of 70 to 100 ml/100 g, and the latter has an amount of an oil absorbed of 40 to 70 ml/100 g. Furthermore, the former has a pigment volume concentration of as low as 35% or below, but the latter has a high pigment volume concentration of 40 to 50%.

Moreover, this particle has a volume standard median diameter ($D_{50}$) of generally 0.1 to 10 μm, especially 0.1 to 3 μm, as measured by a laser scattering diffraction method.

Dawsonite according to this invention as already mentioned has excellent filtrability, and has an advantage that the amount of impurity ion contained is very small. When dawsonite is formed into an aqueous slurry having a concentration of 5% by weight, a conventional dawsonite has a specific resistance generally on the order of 6000 Ω·cm, but the dawsonite according to this invention can have a specific resistance of at least 8000 Ω·cm.

For this reason, when the dawsonite according to this invention is compounded in a resin, etc., a deterioration of coloration, a heat deterioration and electrical insulation by the impurity ions can be suppressed, and the excellent advantage as the resin compounding agent can be obtained.

With respect to the above-mentioned particle structure, the dawsonite according to this invention has excellent compoundability and dispersibility in resins, and furthermore, the compounded resin has excellent transparency. In fact, a reference to the examples to be mentioned below shows that the compounded resin has a small internal haze, and posseses excellent transparency.

Figure 19:
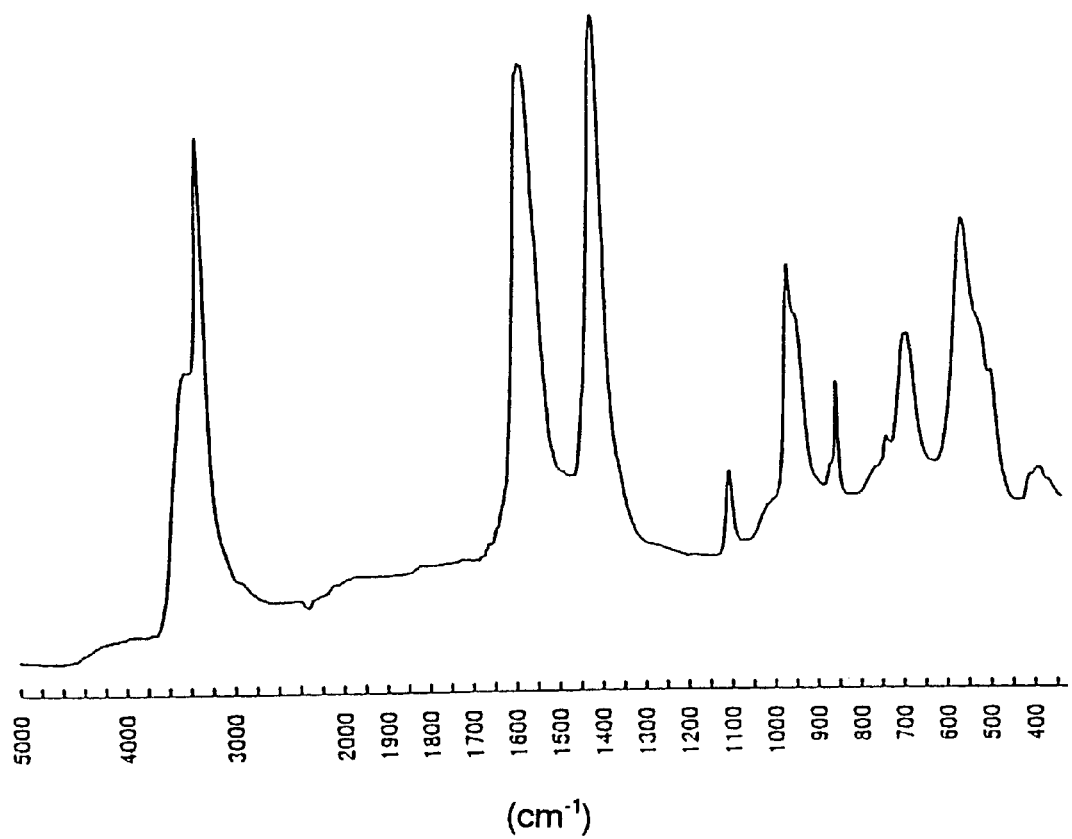
FIG. 19 is an infrared absorption spectrum chart of a dawsonite-type sodium aluminum complex hydroxide carbonate salt (NAHCS) in accordance with Example 7 of this invention.

FIG. 19 shows an infrared absorption spectrum of dawsonite according to this invention. It is seen therefore that this dawsonite shows markedly wide absorptions in an infrared region, and is useful as an infrared absorbing agent, namely a warmth-keeping agent.

The dawsonite according to this invention generally has an amount of an oil absorbed (JIS K-5101) of 50 to 110 ml/100 g, a BET specific surface area of 30 to 110 m$^2$/g, and an apparent specific gravity (iron cylinder method) of 0.1 to 0.3 g/cm$^3$. However, these values are not limited to the above-mentioned values.

The lithium aluminum complex-type or the dawsonite-type alkali aluminum complex hydroxide carbonate salt are useful as a resin compounding agent, for example especially a warmth-keeping agent and a halogen trapping agent for resins.

Uses

LAHCS and dawsonite-type NAHCS according to this invention can be compounded in resins without any treatment. In order to modify the surface properties of the complex salts, when these compounds are treated in advance with not larger than 10% by weight, especially 1 to 6% by weight, of a surface treating agent, it is preferred that their dispersibility in resins increases and transmittance will further be increased.

As the surface treating agent, silane-type, aluminum-type, titanium-type, and zirconium-type coupling agents, higher fatty acids, metal soaps, or resin acid soaps, fine powder amorphous silica and surface active agents may be used according to the objects.

Generally, a higher fatty acid or a surface active agent is added to the reaction mother liquor containing the alkali aluminum complex hydroxide carbonate salt, and the mixture is treated with stirring.

Examples of the higher fatty acid include saturated or unsaturated fatty acids having 10 to 22 carbon atoms, especially 14 to 18 carbon atoms, for example saturated fatty acids such as capric acid, undecanoic acid, lauric acid, myristic acid, palmitic acid, margaric acid, stearic acid and arachic acid, and unsaturated fatty acids such as linderic acid, tsuzic acid, petroselinic acid, oleic acid, linoleic acid, linolenic acid, and arachidonic acid. Stearic acid is preferred. The fatty acids may of course be mixed fatty acids such as beef tallow fatty acid, coconut oil fatty acid or palm oil fatty acid.

Among the surface active agents, examples of anion surface active agents include primary higher alcohol sulfate ester salts, secondary higher alcohol sulfate ester salts, primary higher alkylsulfonate salts, secondary higher alkylsulfonate salts, higher alkyldisulfonate salts, sulfonated higher fatty acid salts, higher fatty acid sulfate ester salts, higher fatty acid ester sulfonate salts, sulfate ester salts of higher alcohol ethers, sulfonate salts of higher alcohol ethers, alkylolated sulfate ester salts of higher fatty acid amides, alkyl-benzenesulfonate salts, alkylphenolsulfonate salts, akylnaphthalenesulfonate salts and alkylbenzoimidazolesulfonate salts. More specific compounds of such surface active agents are disclosed in Hiroshi Horiguchi, "SYNTHETIC SURFACE ACTIVE AGENTS" (published in 1966 by Sankyo Publishing Company).

As nonionic surface active agents, there are used nonionic surface active agents having a low HLB, especially an HLB of 12 or below, more preferably an HLB of 8 or below. Generally, examples of the nonionic surface active agents include polyoxyethylene alkyl ether, polyoxyethylene alkyl phenyl ether, polyoxyethylene fatty acid esters, polyoxyethylene fatty acid amide ethers, polyvalent alcohol fatty acid esters, polyoxyethylene polyvalent alcohol fatty acid esters, fatty acid sucrose esters, alkylolamides and polyoxyalkylene block copolymers each with the HLB being within the above range. For example, when the polyoxyethylene unit content of these nonionic surface active agents is decreased, their HLB will be decreased. Therefore, by adjusting the number of moles of ethylene oxide added, it is possible to obtain nonionic surface active agents having the desired HLB.

The amount of the fatty acid or the surface active agent to be added may suitably be 0.5 to 10% by weight, especially 1 to 5% by weight, based on the alkali aluminum complex hydroxide carbonate salt.

The treating conditions are not particularly restricted, but generally the treatment should be suitably carried out with stirring at a temperature of 60 to 100° C. for about 0.5 to 5 hours. When the fatty acid is used, the fatty acid used reacts with a sodium ion present in the reaction system and is transferred to the aqueous phase in the form of a sodium soap, and the surface treatment of the resulting alkali aluminum complex hydroxide carbonate salt proceeds. When the anionic surface active agent is used, a free acid which is not a salt is used and consequently, a similar reaction takes place.

The resulting surface-treated alkali aluminum complex hydroxide carbonate salt as it is may be used as a resin compounding agent. As required, it is surface-treated with an organic or inorganic aid as being after-treated, and then used as a resin stabilizer or a resin compounding agent.

Examples of such organic aids are coating agents, for example, metal soaps such as a calcium salt, a zinc salt, a magnesium salt and a barium salt of stearic acid, palmitic acid and lauric acid, silane coupling agents, aluminum coupling agents, titanium coupling agents and zirconium coupling agents, various waxes and unmodified or modified various resins (such as rosin and petroleum resins).

These coating agents may be used in an amount of 0.1 to 10% by weight, especially 0.5 to 5% by weight, based on the alkali aluminum complex hydroxide carbonate salt.

As the inorganic aids, fine particle silica such as aerosil and hydrophobic-treated aerosil, silicate salts such as calcium silicate and magnesium silicate, metal oxides such as calcia, magnesia and titania, metal hydroxides such as magnesium hydroxide and aluminum hydroxide, a metal carbonate such as calcium carbonate, hydrotalcite, synthetic zeolites such as A type or P type, acid-treated products thereof, or their metal ion exchanged products thereof are exemplified regular-shaped particles of the inorganic aids may be used as blended or sprinkled with the alkali aluminum complex hydroxide carbonate salts, or may be used as deposited on the surface of the alkali aluminum complex hydroxide carbonate salt particles. By treating the resulting complex hydroxide carbonate salts with the inorganic aids, the refractive indexes of these salts may be adjusted.

These inorganic aids may be used in an amount of 0.01 to 10% by weight, especially 0.1 to 5% by weight, based on the alkali·aluminum complex hydroxide carbonate salt. When it is used as a compounding agent for resins, the refractive index of the resulting product can be matched with that of the resin used.

LAHCS according to this invention is useful for regin compounding agent to thermoplatic resins such as a chlorine catcher, a heat stabilizer, an infrared absorption agent or an anti-blocking agent. Furtheremore, NAHCS is particularly useful as an infrared absorbing agent (warmth-keeping agent).

According to this invention, 0.01 to 10 parts by weight in general of the alkali aluminum complex hydroxide carbonate salt is compounded in 100 parts by weight of a thermoplastic resin. The compounding amount may of course be properly selected according to the type and use of the resin within the above-mentioned range.

According to one preferred embodiment of this invention, the alkali aluminum complex hydroxide carbonate salt may be used in an amount of 0.1 to 10 parts by weight, especially 0.5 to 1.0 part by weight, based on 100 parts by weight of a chlorine-containing polymer.

Examples of the chlorine-containing polymer include poly(vinyl chloride), poly(vinylidene chloride), chlorinated ply(vinyl chloride), chlorinated polyethylene, chlorinated polypropylene, chlorinated rubbers, a vinyl chloride/vinyl acetate copolymer, a vinyl chloride/ethylene copolymer, a vinyl chloride/propylene copolymer, a vinyl chloride/styrene copolymer, a vinyl chloride/isobutylene copolymer, a vinyl chloride/vinylidene chloride copolymer, a vinyl chloride/styrene/maleic anhydride ternary copolymer, a vinyl chloride/styrene/acrylonitrile copolymer, a vinyl chloride/butadiene copolymer, a chlorinated vinyl/propylene chloride copolymer, a vinyl chloride/vinylidene chloride/vinyl acetate ternary copolymer, a vinyl chloride/acrylic acid ester copolymer, a vinyl chloride/maleic acid ester copolymer, a vinyl chloride/methacrylic ester copolymer, a vinyl chloride/acrylonitrile copolymer, an internally plasticized polyvinyl chloride; and blends of these chlorine-containing polymers and α-olefin polymers such as polyethylene, polypropylene, polybutene and poly-3-methylbutene, polyolefins and copolymers such as an ethylene/vinyl acetate copolymer and an ethylene/propylene copolymer, polystyrene or acrylic resins, copolymers of styrene with another monomer (such as maleic anhydride, butadiene and acrylonitrile), an acrylonitrile-butadiene-styrene copolymer, an acrylic ester/butadiene/styrene copolymer or a methacrylic ester/butadiene/styrene copolymer.

In this case, it is desirable to jointly use 0.01 to 10 parts by weight of a zinc salt of a fatty acid and 0.01 to 10 parts by weight of a β-diketone or a β-keto acid ester.

Examples of the zinc salt of fatty acids may be as illustrated above. Examples of the β-diketone or the β-keto acid esters are compounds known coventionally in the indicated utility, and include 1,3-cyclohexadione, methylene-bis-1,3-cyclohexadione, 2-benzyl-1,3-cyclohexadione, acetyltetralone, palmitoyltetralone, stearoyltetralone, benzoyltetralone, 2-acetylcyclohexanone, 2-benzoylcyclohexanone, 2-acetyl-1,3-cyclohexanedione, benzoyl-p-chlorobenzoylmethane, bis(4-methyl-benzoyl) methane, bis(2-hydroxybenzoyl) methane, benzoylacetone, tribenzoyl-methane, diacetylbenzoylmethane, stearoylbenzoylmethane, palmitoylbenzoyl-methane, lauroylbenzoylmethane, dibenzoylmethane, bis(4-chlorobenzoyl)methane, bis(methylene-3,4-dioxybenzoyl) methane, benzoylacetylphenylmethane, stearoyl(4-methoxybenzoyl)methane, butanoylacetone, distearoylmethane, acetylacetone, stearoylacetone, bis(cyclohexanoyl)-methane and dipivaloylmethane.

Of course, to use the alkali aluminum complex hydroxide carbonate salt according to this invention, various known additives such as stabilizers or stabilizer assistants, for example, non-metallic stabilizers, organic tin-type stabilizers and basic inorganic acid salts, plasticizers, antioxidants, photostabilizers, fire retardants, nucleus-forming agents, and epoxy stabilizers may be used jointly.

Various nucleus-forming agents are conjointly used as additives in the molding of crystalline resins such as polypropylene and polyethylene terephthalate to be mentioned to increase transparency and impact strength or shorten the molding cycle and increase the dimensional stability.

Furthermore, in the chlorine-containing resins, a combined use with various stabilizers is possible. For example, it is preferred that an organic tin stabilizer is used in combination. Examples of the organic tin compounds include organic tin mercaptides, organic tin sulfides, organic tin mercaptides sulfides, organic tin mercaptcarboxylates and organic tin carboxylates.

(1) Examples of the organic tin mercaptides include diorganic mercaptides such as dibutyltin bis(lauryl mercaptide), dimethyltin bis(stearyl mercaptide), dioctyltin bis(mercaptoethyl tall oil fatty acid ester), dioctyltin bis(2-mercaptoethyl caprylate), dibutyltin bis(mercaptoethyl tall oil fatty acid ester), dimethyltin bis(mercaptoethyl stearate), dioctyltin bis(isooctyl thioglycolate), dioctyltin bis(2-ethylhexyl thioglycolate), dioctyltin bis(dodecyl thioglycolate), dioctyltin bis(tetradecyl thioglycolate), dioctyltin bis(hexadecyl thioglycolate), dioctyltin bis(octadecyl thioglycolate), dioctyltin bis($C_{12-16}$ mixed alkyl thioglycolate), dibutyltin bis(isooctyl thioglycolate), dimethyltin bis(isooctyl mercaptopropionate), bis(2-mercaptocarbonylethyl)tinbis(isooctyl thioglycolate), bis(2-butoxycarbonyl ethyl)tin bis(butyl thioglycolate); mono organic mercaptides such as monobutyltin tris(lauryl mercaptide), monobutyl monochlorotin bis(lauryl mercaptide), momooctyltintris(2-mercaptoethyl caprylate), monobutyltintris(mercaptoethyl tall oil fatty acid ester), monomethyltintris(mercaptoethyl tall oil fatty acid ester), monomethyl-tintris(mercaptoethyl laurate), monomethyltintris(mercaptoethyl stearate), monomethyltintris(mercaptoethyl oleate), monooctyltintris (isooctyl thioglycolate), monooctyltintris(2-ethylhexyl thioglycolate), monooctyltintris(dodecyl thioglycolate), monooctyltintris(dodecyl thioglycolate), monooctyltintris (tetradecyl thioglycolate), monooctyltintris(hexadecyl thioglycolate), monooctyltintris($C_{12-16}$mixed alkyl thioglycolate), monooctyltintris(octadecyl thioglycolate), monobutyltintris(isooctyl thioglycolate), monobutyltintris (isooctyl mercapto propionate), monomethyltintris(isooctyl thioglycollate), monomethyltintris(tetra decyl thioglycollate), 2-methoxycarbonylethyl tin tris(isooctyl thioglycollate) and 2-butoxycarbonylethyltintris(2-ethylhexylthioglycollate).

(2) Examples of the organic tin sulfides include methylthiostannic acid, butylthiostannic acid, octylthiostannic acid, dimethyltin sulfide, dibutyltin sulfide, dioctyltin sulfide, dicyclohexyltin sulfide, monobutyltin sulfide, oxide, 2-methoxycarbonylethyltin sulfide, 2-ethoxycarbonyltin sulfide, 2-butoxycarbonyltin sulfide, 2-isopropoxycarbonylethyltin sulfide, bis(2-methoxycarbonylethyl)tin sulfide and bis(2-propoxycarbonylethyl)tin sulfide.

(3) Examples of the organic tin mercaptide sulfides include bis[monobutyl.di(isooctoxycarbonylmethylenethio) tin]sulfide, bis[dibutylmono (isooctoxycarbonylmethylenethio)tin]sulfide, bis[bis(2-methoxycarbonylethyl)tin isooctylthioglycolate] sulfide, bis (methyltin diisooctylthioglycolate) disulfide, bis(methyl/ dimethyltin mono/diisooctyl thioglycolate) disulfide, bis (methyltin diisooctyl thioglycolate) trisulfide, bis(butyltin diisooctyl thioglycolate) trisulfide, bis[methyltin di(2-mercaptoethyl caprylate) sulfide and bis[methyltin di(2-mercaptoethyl caprylate) disulfide.

(4) Examples of the organic tin mercapto carboxylates include dibutyltin-β-mercaptopropionate, dioctyltin-β-mercaptopropionate, dibutyltin mercaptoacetate, bis(2-methoxycarbonylethyl)tin thioglycolate, and bis(2-methoxycarbonylethyl)tin mercaptopropionate.

(5) Examples of the organic tin carobylates include aliphatic monovalent carboxylates such as an octoate, laurate, myristate, palmitate, stearate and isostearate of a mono- or di-methyltin, mono- or di-butyltin, mono- or di-octyl-tin or mono- or bis(butoxycarbonylethyl)tin; a maleate polymer, and a maleate such as butyl maleate, benzyl maleate, oleyl maleate, and stearyl maleate; and mixed salts or basic salts of the above compounds.

The plasticizers include ester-type plasticizers such as phthalate ester type plasticizers and adipate ester type plasticizers, polyester-type plasticizers, phosphate ester-type plasticizers, and chlorine-type plasticizers.

Example of the phenol-type antioxidants include 2,6-diphenyl-4-octa-desiloxyphenol, stearyl(3,5-ditert.butyl-4-hydroxyphenyl)-propionate, distearyl(3,5-di-tert.butyl-4-hydroxybenzyl) phosphonate, 1,6-hexamethylene-bis[(3,5-di-tert. butyl-4-hydroxyphenyl)propionate], 1,6-hexamethylenebis-[(3,5)-di-tert.butyl-4-hydroxyphenyl) proponic acid amide], bis[3,3-bis-(4-hydroxy-3-tert.butylphenyl)butyric acid]glycol ester, 1,1,3-tris(2-methyl-4-hydroxy-5-tert.butylphenyl)butane, 1,3,5-tris(2,6-dimethyl-3-hydroxy-4-tert.butylbenzyl) isocyanurate, 1,3,5-tris(3,5-ditert butyl-4-hydroxybenzyl)isocyanurate, and triethyleneglycol bis[(3-tert butyl-4-hydroxy-5-methylphenyl)propionate].

Examples of the sulfur-type antioxidants include dialkylthiodipropionates such as dilauryl, dimyristyl or distearyl thiopropionate, and β-alkylmercaptopropionate ester of polyol such as pentaerythritol tetra(β-dodecylmercaptopropionate).

Examples of the phosphite-type antioxidants include tris (2,4-di-tert butylphenyl) phosphite, tris[2-tert butyl-4-(3-tert butyl-4-hydroxy-5-methyl phenylthio)-5-methylphenyl] phosphite, tridecyl phosphite, octyl diphenyl phosphite, di(decyl)monophenyl phosphite, di(tridecyl)pentaerythritol diphosphite, distearyl pentaerythritol diphosphite, and di(nonylphenyl)pentaerythrotol diphosphite.

Examples of ultraviolet absorbing agents include 2-hydroxybenzophenones such as 2,4-dihydroxybenzophenone, 2-hydroxy-4-methoxybenzophenone and 5,5'-methylenebis(2-hydroxy-4-methoxybenzophenone); and 2-(2'-hydroxyphenyl)benzotriazoles such as 2-(2'-hydroxy-5'-methylphenyl)benzotriazole, 2-(2'-hydroxy-3'-tert. butyl-5'-methylphenyl)-5-chlorobenzotriazole, 2-(2'-hydroxy-5'-tert octylphenyl)benzotriazole, 2-(2'-hydroxy-3',5'-dicumylphenyl) benzotriazole, and 2,2'-methylenebis(4-tert octyl-6-benzotriazolyl) phenol.

Hindered amine-type photo-stabilizers may be illustrated as a photo-stabilizer. They include 1,2,2,6,6-pentamethyl-4-piperidyl stearate, 2,2,6,6-tetramethyl-4-piperidyl benzoate, N-(2,2,6,6-tetramethyl-4-piperidyl) dodecyl succinic imide, 1-[(3,5-di-tert butyl-4-hydroxyphenyl)propionyloxyethyl]-2,2,6,6-tetramethyl-4-piperidyl-(3,5-di-tert butyl-4 -hydroxyphenyl)propionate, bis(2,2,6,6-tetramethyl-4-piperidyl) sebacate, tetra(2,2,6,6-tetramethyl-4-piperidyl) butanetetracarboxylate, tetra(1,2,2,6,6-pentamethyl-4-piperidyl)butanetetracarboxylate, bis(2,2,6,6-tetramethyl-4-piperidyl) di(tridecyl)butanetetracarboxylate and bis(1,2,2, 6,6-pentamethyl-4-piperidyl) di(tridecyl) butanetetracarboxylate.

Examples of the fire retardants include tetrabromobisphenol A (TBA), 2,2-bis(4-hyroxy-3,5-dibromophenyl)propane, hexabromobenzene (HBB), tris(2,3-dibromopropyl) isocyanurate (TAIC-bB), 2,2-bis(4-hydroxyethoxy-3,5-dibromo.phenyl)propane (TBA-EO), decabromodiphenyloxide (DBDPO), decabromodiphenyl ether (DBDE), 1,2-bis(pentabromophenyl)ethane (PBPE), N,N'-ethylenebis (tetrabromophthalimide) (ETBP), 1,2,5,6,9,10-hexabromocyclododecane, 2,2-bis(3,5-dibromo-4-[2,3-dibromopropoxy]phenyl) propane (TBA-BP), bis(3,5-dibromo-4-[2,3-dibromopropoxy]phenyl) (TBS-BP), polydibromophenylene oxide, bis(tribromophenoxy)ethane, ethylenebis.dibromo-norbornane dicaroxyimide, dibromoethyl.dibromocyclohexane, dibromoneopentyl glycol, 2,4,6-tribromophenol, tribromophenyl allyl ether, tetrabromobisphenol S, tetradecabromo.diphenoxybenzene, 2,2-bis(4-hydroxyethoxy-3,5-di-bromophenyl) propane, poly(pentabromobenzyl) acrylate, tribromostyrene, tribromophenyl maleimide, tribromoneopentyl alcohol, tetrabromodipenta-erythritol, pentabromobenzyl acrylate, pentabromophenol, pentabromotoluene, pentabromophenyl oxide, hexabromocyclododecane, hexabromodiphenyl ether, octabromophenol ether, octabromophenyl ether, octabromodiphenyl oxide, dibromoneopentyl glycol tetracarbonate, bis(tribromophenyl)fumaric acid amide, N-methylhexabromo diphenylamine, halogen-containing polyphosphate, aromatic bromine compounds, brominated epoxy resins, and brominated polystyrene.

Examples of the nucleus-forming agents include aluminum-p-tert-butyl benzoate, dibenzylidene sorbitol, bis (4-tert.butylphenyl) phosphate sodium salt, 2,2'- methylenebis(4,6-di-tert butylphenyl)phosphate sodium salt, 2,2'-methylenebis(4,6-di-tert.butylphenyl) phosphate calcium salt and 2,2'-methylenebis(4,6-di-tert.butylphenyl) phosphate basic aluminum salt.

Examples of the epoxy compounds include epoxydized soybean oil, epoxydized linseed oil, epoxydized fish oils, epoxydized tall oil fatty acid esters, epoxydized beef tallow oil, epoxydized castor oil, epoxydized safflower oil, epoxydized linseed oil fatty acid butyl, tris(epoxypropyl) isocyanurate, 3-(2-xenoxy)-1,2-epoxypropane, bisphenol-A diglycidyl ether, vinylcyclohexene diepoxide, dicyclopentadiene diepoxide and 3,4-epoxycyclohexyl-6-methylepoxycyclohexanecarboxylate.

In another typical use of this invention, the alkali aluminum complex hydroxide carbonate salt is compounded in an olefin resin in order to prevent the deterioration of the resin due to the halogen-type catalyst residues. The compounding agent of the present invention may be used preferably in an amount of 0.01 to 10 parts by weight per 100 parts by weight of the olefin resin. Examples of the olefin type resins include polypropylene, low-, medium-, and high-density or linear low-density polyethylenes, a crystalline propylene/ethylene copolymer, ionically crosslinked olefin copolymers, an ethylene/vinyl acetate copolymer, an ethylene/acrylate copolymer, a low-density ethylene/butene-1 copolymer and a low-density ethylene/hexene-1 copolymer. The olefin type resins include those synthesized by using metallocene catalysts.

In still further usages of this invention, the alkali aluminum complex hydroxide carbonate salt is compounded in an amount of 1 to 30 parts by weight per 100 parts by weight of an olefin resin for the formation of an agricultural film together with an anticlouding agent. The olefin resin suitably includes the above illustrated resins.

The present invention will be illustrated by citing Examples, but the invention is not limited by such examples.

EXAMPLES

Fine powders of the alkali aluminum complex hydroxide carbonate salts, such as a lithium aluminum complex hydroxide carbonate salt (LAHCS), a sodium aluminum complex hydroxide carbonate salt (dawsonite-type NAHCS) and a lithium sodium aluminum complex hydroxide carbonate salt (mixed crystal, LNAHCS), methods of producing these carbonate salts, and their uses will be explained below.

Measuring Methods (1) X-Ray Diffraction

The X-ray diffraction was measured by using Geigerflex (goniometer: Cat No. 2125D1) made by Rigaku Co. under the following conditions.

| Target | Cu |
|---|---|
| Filter | Ni |
| Detector | SC |
| Voltage | 35 KV |
| Current | 15 mA |
| Count flull scale | 8000 c/s |
| Scanning speed | 2 deg/min. |
| Time constant | 1 sec |
| Slit | DS 1 deg. RS 0.3 mm SS 1 deg |
| Irradiation | 6 degree |

(2) Lamination Asymmetry Index (Is)

The index was measured by using Geigerflex (goniometer: Cat No. 2125D1) made by Rigaku Co. under the following conditions.

| Target | Cu |
|---|---|
| Filter | Ni |
| Detector | SC |
| Voltage | 40 KVP |
| Current | 20 mA |
| Count full scale | 1000 c/s |
| Scanning speed | 1 deg/min. |
| Time constant | 1 sec |
| Slit | DS 1 degree RS 0.3 mm SS 1 deg |
| Irradiation | 6 deg |
| Measured diffraction angles | 35 to 55 (2 θ degree) |

The method of calculating the lamination asymmetry index(Is) comprises drawing peak tangents (a, b) on a narrow angle side and a broad angle side with respect to both peaks at diffraction angles (2θ) of 36° to 44° and 44° to 53° obtained by the above X-ray diffractions so that the absolute values of the inclinations become maximum. Next, a perpendicular c is drawn from a point of intersection between the peak tangent a on the narrow angle and the peak tangent b on the broad angle. Thus, an angle $\theta_1$ formed between the tangent a and the perpendicular c and an angle $\theta_2$ formed between the tangent b and the perpendicular c are measured, and the lamination asymmetry index (Is) is measured from the following formula.

$$Is = \tan\theta_2 / \tan\theta_1$$

(3) Orientation Degree (OD)

The orientation degree (OD) is defined by the following formula $$OD = I(002)/I(110)$$

wherein I(002) is a relative intensity of a peak in an X-ray diffraction (Cu-Kα) appearing in an index of the plane (002) at a spacing (d) of 7.67 to 7.84 Å, and I(110) is a relative intensity of a peak in an X-ray diffraction (Cu-Kα) appearing in an index of the plane (110) at a spacing (d) of 4.41 to 4.45 Å.

(4) Thermal Analysis

A measurement sample was in advance treated with ethyl alcohol to remove the surface treating agent, and dried at 110° C. by using a constant temperature dryer. Then, the thermal analysis was carried out by using TAS100-TG8110 thermal analysis system made by Rigaku Co. The measuring conditions included α-$Al_2O_3$ as a standard substance, a temperature raising speed of 10° C./min. and air as an atmosphere, and under the above conditions, and a weight decrease ratio was measured at a temperature of 250° C. or below.

(5) Infrared Absorption Spectrum Analysis

A measuring sample was in advance treated with ethyl alcohol to remove the surface treating agent, and dried at 110° C. by using a constant temperature dryer. Then, the measurement was carried out by using an A-302 type infrared absorption spectrum analyzing instrument made by Nippon Bunko Co.

(6) Fiber Diameter and Aspect Ratio

Using a scanning electron microscope (S-570) made by Hitachi Co, the fiber diameter in a restricted visual image and the aspect ratio were calculated.

(7) Apparent Density

Measured in accordance with JIS K-6220.

(8) Amount of an Oil Absorbed

Measured in accordance with JIS K-5101-19.

(9) Specific Surface Area

Using Sorptomatic Series 1900 made by Carlo Erba Co., a specific surface area by BET was measured.

(10) Average Particle Diameter

The average particle diameter (median diameter: $\mu$m) was measured by using a laser diffraction-type particle size analyzer (Coulter RLS130) produced by Coulter Counter Co.

(11) Pigment Volume Concentration

DOP (dioctyl phthalate) was used as a vehicle, and the concentration was calculated by the following formula.

Pigment volume concentration=100B$\rho$/(B$\rho$+0.01 Or P$\rho$)

B$\rho$: the density (g/ml) of the resin (vehicle), (DEP: 0.9861)

P$\rho$: the density (g/ml) of the sample

Or: the amount of an oil absorbed in the sample (ml/100 g)

A Process by the Migration Method and the Properties of the Product

Example 1

Gibbsite-type hydrated alumina (Hidilight H-42 produced by Showa Denko Co., Ltd.=617.5 g) having an average particle diameter of 1.4 $\mu$m and 148.6 g of lithium carbonate were charged in 3.5 liters of ion exchanged water placed in 10 liters of a stainless steel container so that as alumina (Al$_2$O$_3$), the concentration became 10% (hereinafter weight % otherwise stated). The mixture was heated to 90° C. with stirring and reacted for 4 hours. The solid concentration of the resulting LAHCS was 16%, and the pH at the end of the reaction was 10.5. Thereafter, 18.2 g of sodium stearate was added under heating with stirring to perform the surface treatment for about 2 hours. After filtration, the product was dried at 110° C., and pulverized and classified to give 617 g of a powder of LAHCS as a sample No. 1. In this Example, the amount of a carbonic acid ion based on the entire aluminum atoms in the reaction system was 0.17 mole.

Example 2

In the same way as in Example 1, a LAHCS powder as a sample No. 2 was obtained by the same method of Example 1 except that sodium carbonate and lithium chloride were used instead of the lithium carbonate in Example 1. In this Example, the product was filtered and thereafter, washed thoroughly with ion exchanged water.

Example 3

Gibbsite-type hydrated alumina was classified to obtain a gibbsite hydrated alumina having an average particle diameter of 0.6 $\mu$m and containing 0.5% of particles having a particle size of at least 20 $\mu$m and a gibbsite hydrated alumina having an average particle diameter of 4.8 $\mu$m and containing 1.8% of particles having a particle size of at least 20 $\mu$m, as starting materials. Powders of LAHCS were obtained in the same way as in Example 1 except that these starting materials were used. The products were samples Nos. 3 and 4. The solid concentrations of these LAHCS samples were 11.5% and 18.5% respectively.

Example 4

Example 1 was repeated except that a gibbsite-type hydrated alumina having an average particle diameter of 0.6 $\mu$m and containing 1.8% of particles having a particle size diameter of at least 20 $\mu$m was used as a starting material and hydrothermal treatment was performed at a reaction temperature of 130° C. Otherwise, Example 1 was repeated in the same way as mentioned above to give an LAHCS powder. The product was a sample No. 5. Incidentally, the reaction time was 2 hours.

Comparative Example 1

A commercially available gibbsite-type hydrated alumina having an average particle diameter of 4.8 $\mu$m and containing 4.8% of particles having a particle size of at least 20 $\mu$m was used as a starting material. Otherwise, a LAHCS powder was prepared in the same way as in Example 1 to give a sample No. H-1.

Comparative Example 2

An LAHCS powder was prepared in the same way as in Example 1 except that in Comparative Exampe 1, the average particle diameter was 6 $\mu$m and the amount of particles having at least 20 $\mu$m was 4.5%. The resulting product was referred to as a sample No. H-2.

Comparative Example 3

24.08 g of sodium hydroxide (96% of NaOH) and 3.73 g of sodium carbonate (99% of Na$_2$CO$_3$) were added to 2.3 liters of distilled water with stirring, and the solution was heated at 40° C. To this aqueous solution was gradually poured an aqueous solution prepared by adding 49.78 g of aluminum chloride (20.48% of Al$_2$O$_3$) to 250 mL of distilled water so that the mole ratio of CO$_3$/Li became 2. Furthermore, the reaction was performed with stirring at 90° C. for 15 hours. Then, the reaction mixture was filtered, washed with water, and again dispersed in distilled water to give a slurry of LAHCS having a solid concentration of 2.33%.

Then, oleic acid was added in an amount of 5% based on the LAHCS solid content, and the product was stirred and surface-treated. Thereafter, the product was filtered, dried at 60° C. and pulverized by a small sample mill to give an orientation enhancer-treated LAHCS, a sample No. H-3.

Comparative Example 4

24.08 g of sodium hydroxide (96% of NaOH), 2.13 g of sodium carbonate (99% of Na$_2$CO$_3$), and 2.73 g of lithium carbonate (99% of LiCO$_3$) were added to 2.3 liters of distilled water with stirring, and the solution was heated to 40° C. Then, to this aqueous solution was gradually poured an aqueous solution prepared by adding 49.78 g of aluminum chloride (20.48% of Al$_2$O$_3$) to 250 mL of distilled water so that the CO$_3$/Li mole ratio became 2. The pH after pouring of the aqueous solution was 10.1. Furthermore, the reaction was performed for 15 hours at a temperature of 90° C. with stirring to give a LAHCS slurry having a solid concentration of 3.5%.

Thereafter, the product was filtered, dried at 70° C., and pulverized by a small sample mill to give an orientation enhancer-treated LAHCS as a sample No. H-4.

TABLE 3

| Sample No. | 1 | 2 | 3 | 4 | 5 | H-1 | H-2 | H-3 | H-4 |
|---|---|---|---|---|---|---|---|---|---|
| Lamination asymmetry index | 0.605 | 0.61 | 0.753 | 0.825 | 0.332 | 1.302 | 1.461 | 1.438 | 1.452 |
| Degree of orientation | 6.35 | 7.22 | 6.53 | 6.62 | 6.48 | 7.56 | 6.83 | 46.80 | 47.30 |
| Average particle diameter ($\mu$m) | 2.7 | 2.8 | 2.6 | 2.7 | 2.7 | 5.5 | 4.4 | 3.5 | 3.8 |
| Apparent specific gravity (g/ml) | 0.259 | 0.258 | 0.259 | 0.259 | 0.258 | 0.320 | 0.120 | 0.112 | 0.113 |
| Oil absorption amount (ml/100 g) | 45 | 45 | 45 | 45 | 45 | 26 | 71 | 68 | 70 |
| Specific surface area (m$^2$/g) | 9.74 | 9.82 | 9.76 | 9.80 | 9.86 | 2.30 | 25.6 | 25.7 | 26.3 |
| Pigment volume concentration (%) | 52.7 | 52.7 | 52.7 | 52.7 | 52.7 | — | — | 42.4 | 41.7 |
| Dispersibility (number/m$^2$) | 1 | 1 | 1 | 1 | 1 | 43 | 38 | 1 | 1 |
| Transparency (%) | 87 | 87 | 87 | 87 | 87 | 75 | 72 | 82 | 84 |
| Chlorine trapping property (min) | 85 | 85 | 85 | 85 | 85 | 32 | 36 | 80 | 81 |

Process by the Hydrated Alumina Gel Method, the Product and its Properties

Example 5

789.4 g of aluminum sulfate (7.75% of Al$_2$O$_3$) was added to distilled water to prepare 700 mL of an aqueous solution. Separately, distilled water was added to 188.4 g of sodium carbonate (99.7% of Na$_2$CO$_3$) to prepare 700 mL of an aqueous solution. Two hundred mL of warm water at 60° C. was added to a 2-liter beaker and with stirring, the above distilled waters were added simultaneously. Furthermore, 2 g of sodium hydroxide was added to the above mixture to adjust the pH of the aqueous solution to 10. The mixture was heated to 60° C. to obtain a pseudo-boehmite type hydrated alumina gel having a concentration of 3.6% as alumina (Al$_2$O$_3$).

Thereafter, 22.4 g of a lithium carbonate powder was added to the slurry solution so that the Al/Li mole ratio became 2 (or the carbonic acid ion based on the total aluminum atoms became 0.67 mole ratio), and the reaction was performed at 90° C. for 10 hours. The pH after addition was 10.1. After the end of the reaction, 12.1 g of stearic acid was added, and the surface of the product was treated by stirring. The resultant reaction suspension was filtered, washed with water, dried at 110° C. and pulverized with a small sample mill to give a lithium aluminum complex-type LAHCS (yield 98.6%) as a sample No. 6.

Example 6

Distilled water was added to 352 g of an aqueous solution of sodium aluminate (containing 23.7% of Al$_2$O$_3$) to prepare 700 mL of an aqueous solution and the solution was heated to 50° C. With stirring, 566.7 g of aluminum sulfate (7.78% of Al$_2$O$_3$) and distilled water were added to the heated solution to prepare 800 mL of an aqueous solution and to give an amorphous hydrated alumina gel.

Thereafter, 14.62 g of sodium hydroxide was added to the slurry to adjust the pH to 10. Thereafter, 46.65 g of a powder of lithium carbonate (99% of LiCO$_3$) was added so that the Al/Li mole ratio was adjusted to 2, and thereafter the mixture was reacted at 90° C. for 10 hours. After the addition, the pH was 10.1. After the reaction, 15.1 g of stearic acid was added, and with stirring, the surface-treatment reaction was carried out. Thereafter, by the same operation as in Example 1, a mixed crystal composed of LAHCS and dawsonite-type NAHCS was obtained as LNAHCS as a sample No. 7 (yield 91.5%).

Comparative Example 5

Fifty grams of a commercially available gibbsite-type aluminum hydroxide (average particle diameter of 0.5 $\mu$m) was placed in 200 ml of a 20% aqueous solution of lithium chloride, and the mixture was hydrothermally reacted at 115° C. for 2 hours. Thereafter, 4 g of sodium stearate was added, and with stirring, the surface-treatment was carried out. Then, by the same operation as in Example 1, a sample No. H-5 was obtained. X-ray diffraction showed that the resulting product was a mixture of LiCl.2Al(OH)$_3$.nH$_2$O and gibbsite.

Comparative Example 6

Distilled water (400 ml) was put in advance in a 2-liter beaker, and 500 ml of a 1 mol/l aqueous solution of aluminum chloride and 500 ml of a 4 mol/l aqeuous ammonia were simultaneously added with stirring at room temperature to give a sol of hydrated alumina. The pH of the resulting suspension was 8.2. The reaction suspension was filtered and washed with water over one week to obtain an amorphous hydrated alumina gel.

To the resulting aqueous slurry of hydrated alumina gel, 10.5 g of lithium hydroxide (monohydrate) was added, and the mixture was reacted at 95° C. for 8 hours. By the same operation as in Comparative Example 1, a sample No. H-6 was obtained except that 2.7 g of stearic acid was added. X-ray diffraction showed that the resulting product was a mixture of Li$_2$CO$_3$.4Al(OH)$_3$.nH$_2$O and nordstrandite-type aluminum hydroxide.

TABLE 4

| Sample No. | 6 | H-5 | H-6 |
|---|---|---|---|
| Specific surface area (m$^2$/g) | 51 | 53 | 20 |
| Apparent density (g/ml) | 0.105 | 0.287 | 0.119 |
| Oil absorption amount (ml/100 g) | 65 | 50 | 55 |
| Lamination asymmetry index (about 40 deg) | 0.65 | obscure | 0.71 |
| Lamination asymmetry index (about 48 deg) | 0.65 | obscure | 0.93 |
| Pigment volume concentration (%) | 43.5 | — | — |

Example 7

Distilled water was added to 789.4 g of aluminum sulfate (containing 7.75% of Al$_2$O$_3$) to prepare 700 mL of an aqueous solution. Separately, distilled water was added to 188.4 g of sodium carbonate (containing 99.7% of Na$_2$CO$_3$) to prepare 700 mL of an aqueous solution. These aqeuous solutions were simultaneously added to 200 mL of warm water at 60° C. which was stirred in a 2-liter beaker to obtain an amorphous hydrated alumina gel.

Then, 101.8 g of a powder of sodium hydrogencarbonate (containing 99% of $NaHCO_3$) was added to the slurry solution so that the mole ratio of $CO_3$/Al became 1. Then, the mixture was reacted at 90° C. for 2 hours. The pH after the addition was 8.8. After the reaction, 12.1 g of stearic acid was added, and the surface-treatment reaction was carried out. Thereafter, by the same operation as in Example 1, dawsonite-type NAHCS as a sample No. 8 was obtained in a yield of 99.2%.

Example 8

Distilled water was added to 789.4 g of aluminum (containing 7.75% of $Al_2O_3$) to prepare 700 mL of an aqueous solution. Separately, distilled water was added to 188.4 g of sodium carbonate (containing 99.7% of $Na_2CO_3$) to prepare 700 mL of an aqueous solution. These aqeuous solutions were added simultaneously to 200 mL of warm water at 60° C. in a 2-liter beaker with stirring. Furthermore, sodium hydroxide was added to adjust the pH to 9. The mixture was heated at 60° C. to give a pseudoboehmite type hydrated alumina gel.

Then, 101.8 g of sodium hydrogen carbonate (containing 99% of $NaHCO_3$) was added so that the $CO_3$/Al mol ratio was adjusted to 3. Then, the aqueous solution was reacted at 90° C. for 2 hours. After the reaction, the pH was 10.1. After the end of the reaction, 12.1 g of stearic acid was added, and with stirring, the surface treatment reaction was carried out. Thereafter, by the same operation as in Example 1, dawsonite-type NAHCS was obtained as a sample No. 9 (yield 98.7%).

Example 9

Basic aluminum sulfate was added dropwise to an oil heated at 85° C., and thereafter, 789.5 g of amorphous hydrated alumina gel (water content 91%, and 75% of $Al_2O_3$) obtained by thorough washing was put in a 2-liter beaker, and distilled water was added to prepare 1500 ml of an aqueous solution. Then, 252 g of a powder of sodium hydrogen carbonate (99% of $NaHCO_3$) was added so that the $CO_3$/Al was adjusted to 3, and thereafter, the mixture was reacted at 90° C. for 2 hours. After the addition, the pH was 8.8. After the end of the reaction, 12.1 g of stearic acid was added, and the surface-treatment reaction was carried out with stirring. Thereafter, by the same operation as in Example 1, dawsonite-type NAHCS as a sample No. 10 was obtained in a yield of 98.8%.

Example 10

Distilled water was added to 934.1 g of aluminum sulfate (containing 7.75% of $Al_2O_3$) to prepare 800 mL of an aqueous solution. Separately, distilled water was added to 221.5 g of sodium carbonate (99.7% of $Na_2CO_3$) to prepare 800 mL of an aqueous solution. Warm water (200 mL) at 60° C. was added to a 2-liter beaker, and with stirring, the above aqueous solutions were simultaneously added to give amorphous hydrated alumina gel.

Then, 119.3 g of sodium hydrogen carbonate (99% of $NaHCO_3$) was added to the slurry solution so that the $Co_3$/Al mole ratio became 1. Thereafter, the mixture was reacted at 90° C. for 2 hours. Furthermore, 2 g of sodium hydroxide was added to adjust the pH to 10, and then 6.6 g of a powder of lithium carbonate was added so that the Al/Li mol ratio became 8. After the addition, the pH was 10.1. After the reaction, 12.1 g of stearic acid was added, and with stirring, the surface-treatment reaction was carried out. Thereafter, by the same operation as in Comparative Example 1, a mixed crystal composed of a lithium aluminum complex type and a dawsonite-type as a sample No. 11 (LNAHCS; yield 97.8%) was obtained.

Comparative Example 7

88.8 g of sodium hydroxide (containing 96% of NaOH), 84.0 g of sodium hydrogen carbonate (containing 99% of $NaHCO_3$) and 600.6 g of urea (containing 97% of $NH_2CONH_2$) were dissolved in 1815 g of an aqueous solution of sodium aluminate ($Al_2O_3$=2.8%, $Na_2O$=2.3%) with stirring. This mixed solution was heated at 90° C. and further reacted at 90° C. for 20 hours with stirring. After the end of the reaction, 7.2 g of sodium oleate was added and the surface-treatment reaction was carried out. Thereafter, by the same operation as in Comparative Example 1, dawsonite-type basic aluminum carbonate complex salt as a conventional needle-like crystal as a sample No. H-7 was obtained.

TABLE 5

| Sample No. | 8 | 9 | 10 | 11 | H-7 |
|---|---|---|---|---|---|
| Half width of hkl (011)[deg] | 0.46 | 0.66 | 0.53 | 0.50 | 0.30 |
| Average particle diameter (μm) | 0.85 | 0.86 | 0.86 | 0.86 | 0.36 |
| Aspect ratio | 1.2 | 1.5 | 1.6 | 1.3 | 40 |
| Apparent density (g/ml) | 0.25 | 0.29 | 0.28 | 0.25 | 0.18 |
| Amount of an oil absorbed (ml/100 g) | 54 | 54 | 54 | 60 | 92 |
| Specific surface area (m²/g) | 52 | 70 | 57 | 50 | 31 |
| Weight decrease (%) at ~250° C. | 3.8 | 4.8 | 4.4 | 3.7 | 2.3 |
| Pigment volume concentration (%) | 42.9 | 42.9 | 42.9 | — | 30.6 |

A Process for Producing a Conventional Method Dawsonite for Preparation of a Warmth-Keeping Agent and its Properties In the following Examples, dawsonite for evaluating a resin warmth-keeping agent was prepared by a conventional method.

Example 11

46.78 g of sodium carbonate (99.7% of $Na_2CO_3$) was added to 400 ml of distilled water with stirring, and the resulting aqueous solution was heated to 40° C. Then, 400 ml of an aqueous solution containing 48.29 g of aluminum chloride (containing 97% of $AlCl_3.6H_2O$) was gradually poured, and with stirrring, the mixture was reacted at 85° C. for about 20 hours. Thereafter, 1.44 g of stearic acid was added, and with stirring, the surface-treatment was carried out. Thereafter, the slurry-like product was filtered, washed with water, dried at 70° C. and pulverized by a small sample mill to give a resin warmth-keeping agent in accord-with this invention as a sample No. 12.

Example 12

88.8 g of sodium hydroxide (containing 96% of NaOH), 84 g of sodium hydrogen carbonate (containing 99% of $NaHCO_3$) and 600.6 g of urea (con-taining 97% of $NH_2CONH_2$) were dissolved with stirring in 1815 g of an aqueous solution of sodium aluminate (2.8% of $Al_2O_3$, and 2.3% of $Na_2O$). Then, the resulting solution was heated to 90° C. with stirring and reacted for 20 hours. Thereafter, 7.2 g of sodium oleate was added to perform surface-treatment. Then, by the same method as in Example 1, a resin warmth-keeping agent of this invention was obtained as a sample No. 13.

Comparative Example 8

37.0 g of sodium hydroxide (containing 96% of NaOH) and 11.16 g of sodium carbonate (containing 99.7% of $Na_2CO_3$) were added to 2 liters of distilled water with stirring, and heated to 40° C. Then, an aqueous solution prepared by adding 61.28 g of magnesium chloride (19.73% of MgO) and 37.33 g of aluminum chloride (20.48% of $Al_2O_3$) to 500 ml of distilled water was gradually poured so that the $CO_3$/Na mol ratio became 0.7, and the Mg/Al mol ratio became 2.0. With stirring, the mixture was reacted at 90° C. for 20 hours. After the end of the reaction, 3.27 g of stearic acid was added, and with stirring, the surface treatment was performed. In the same way as in Example 11, a hydrotalcite powder was obtained as a sample H-8.

TABLE 6

| Sample No. | 12 | 13 | H-8 |
|---|---|---|---|
| Fiber diameter (aspect ratio) | 3(30) | 10(60) | 1(1.5) |
| Apparent specific gravity | 0.16 | 0.13 | 0.24 |
| Oil absorption amount | 65 | 92 | 66 |
| Specific surface area | 64 | 31 | 36 |
| Heat weight loss (110–250° C.) | 6.1 | 2.2 | 11.5 |

As is clear from the heat weight loss value described in FIG. 11 and Table 6, when the warmth-keeping agent of this invention is compared with the hydrotalcite powder (sample No. H-8) utilized heretofore as a resin warmth keeping agent, the warmth-keeping agent of this invention is characterized in that its weight loss at a temperature region of 300° C. or below is outstandingly low.

APPLICATION EXAMPLES

In the following application example,
the heat stability effect, when a stabilizer or warmth-keeping agent of an alkali aluminum complex hydroxide carbonate salt (lithium aluminum complex type or dawsonite type) obtained in Example 1 to 12 is compounded into a chlorine containing resin;
the resin stability (yellowness preventing effect, halogen capturing property) and the dispersibility in a resin, when the stabilizer or warm-keeping agent is compounded into a polyolefin resin comprising a halogen-containing catalyst residue; and further
the warmth-keeping effect in an ethylene/vinyl acetate copolymer resin;
will be explained.

Testing Method

(12) V.R and H.T

The volume resistance (V.R) and the heat stability (H.T) [Congo Red test paper] of a sheet were tested in accordance with JIS K6723. A sheet was prepared under the same conditions and pressed at 190° C. to produce a sheet having a thickness of 1 mm, and its coloring properties (whiteness, color difference, yellowness) were measured.

(13) Heat Stability Duration Test

A sample sheet was placed on a glass plate and put in a Geer's heat aging tester adjusted to 185° C. and taken up every 15 minutes. The coloration degree was evaluated with the eye, and the time required for completing a black decomposition was measured.

(14) Blocking Property

Two pieces of films were overlapped one upon the other, left to stand at 40° C. under a load of 200 g/cm² for 24 houes, and their peeling was evaluated as follows.

⊚: Peel without resistance.
O: Peel with slight difficulty.
Δ: Peel with difficulty.
X: Peel with considerable difficulty.

(15) Fish Eye

By observation with an optical microscope, the number of at least 0.1 mm in 400 cm² of a film was measured.

(16) Scratch Property

A load of 10 kg was applied to a film having a section of 10×10 and was rubbed three times. A scratch prioerty was sought from a haze difference before and after the rubbing.

(17) Transparency

A white light transmission factor of a sample sheet was measured by using a 1001 DP color-difference meter manufactured by Nippon Denshoku Kogyo Co., Ltd.

(18) Yellowness Resistance Test

The above molded sheet was put into a constant temperature constant humidity tank kept at 85° C. and 90% RH and left to stand for 24 days. The surface color phase of the molded sheet was measured by a color-difference meter Model 1001 DP manufactured by Nippon Denshoku Kogyo Co., Ltd. and an N value (yellowness degree) was sought. As the N value is smaller, the yellowness degree resistance is better.

(19) Haze

Evaluated in accordance with ASTM-D-1003.

(20) Warmth-Keeping Property

A tunnel frame with a semicircular cylinder having a diameter of 20 cm and a length of 1 m was constructed with the above sample film and placed over the ground, and the temperature of the central portion of the tunnel frame was measured at night (at 3 o'clock in the morning). Based on the temperature of a tunnel frame made from an EVA film which did not contain a warmth-keeping agent as a standard, a temperature difference (ΔT) was measured to evaluate a warmth-keeping effect. In the present invention, as the ΔT value is larger, the warmth-keeping effect is higher.

Application Example 1

A polypropylene sheet in which the lithium aluminum complex-type resin compounding agent LAHCS was compounded was prepared, and evaluated.

Compounding

| | |
|---|---|
| Polypropylene resin (Hipole F657P) | 100 parts by weight |
| Di-tertiary butyl para-cresol | 0.15 part by weight |
| Silton JC-30 (AB agent made by Mizusawa Chemicals) | 0.05 part by weight |
| Stearic acid Ca | 0.1 part by weight |

Method of Molding

A sample was added to the resulting compounded composition and they were mixed by a supermixer for 1 minute. By using a monoaxial extruder, the resulting mixture was pelletized at 220° C., and a crude film was prepared by T-die forming. Then, the film was stretched 6 times in a vertical direction and 12 times in a transverse direction by a biaxial stretching-type molding machine to obtain a biaxially stretched film having a thickness of 15 μm. The results of the application example are shown in Tables 7 and 8.

TABLE 7

| | Yellowness resistance (N value) | | Heat aging test (N value) | |
|---|---|---|---|---|
| Sample No. | 1 time extrusion | 3 times extrusion | initial value | after 5 hours |
| 1 | 5.1 | 11.3 | 12.2 | 22.6 |
| H-2 | 7.5 | 16.5 | 16.5 | 30.6 |
| H-3 | 6.8 | 15.4 | 17.3 | 28.1 |

TABLE 8

| Sample No. | Amount compounded (ppm) | Haze (%) | AB property | Fish eye | Scratch property (%) |
|---|---|---|---|---|---|
| 1 | 800 | 1.6 | ○ | none | 0.2 |
| 2 | 800 | 1.5 | ○ | none | 0.2 |
| 3 | 800 | 1.7 | ○ | none | 0.2 |
| 4 | 800 | 1.7 | ○ | none | 0.1 |
| 5 | 800 | 1.6 | ○ | none | 0.2 |
| H-2 | 800 | 3.5 | ○ | 4 | 0.4 |
| H-3 | 800 | 3.8 | ○ | 3 | 0.4 |

Application Example 2

To confirm the heat stabilizing effect of the lithium aluminum complex-type resin stabilizer LAHCS on a vinyl chloride resin, a soft vinyl chloride resin sheet was prepared in accordance with the following recipe for compounding and the following molding method, and subjected to the following evaluation tests.

Recipe for Compounding

| | |
|---|---|
| Vinyl chloride resin (degree of polymerization: 1050) | 100 parts by weight |
| Dioctyl phthalate | 50 parts by weight |
| Epoxidized soybean oil | 3 parts by weight |
| Sample (sample No. 1) | 1.3 parts by weight |
| Zinc stearate | 0.4 part by weight |
| bis Phenol A | 0.2 part by weight |
| 1,4-Butanediolbis | 0.1 part by weight |

Molding Method

The above compounded composition was kneaded by a roll mill at 150° C. for 6 minutes to prepare a uniform mixed product having a thickness of 0.5 mm. Then, the mixed product was heated at 170° C. under a pressure for 5 minutes to prepare a soft vinyl chloride resin sheet having a thickness of 1 mm, and its heat stabilizing effect, etc. were evaluated.

As a result, the product had a H.T of 137 minutes, a V.R of $1 \times 10^{13}$, a W of 88.8, a $\Delta E$ of 8.3, and a $\Delta N$ of 9.9. When a coloring preventing agent was not used, the product had a H.T of 90 minutes, and a V.R of $0.83 \times 10^{13}$. Incidentally, the coloration degree of the sheet was measured by a color-difference meter of 1001 DP (whiteness degree W, color difference $\Delta E$, and yellowness degree $\Delta N$) manufactured by Nippon Denshoku Kogyo Co., Ltd.

Application Example 3

A resin stabilizer (sample No. 1) in accordance with this invention was compounded in a chlorinated vinyl chloride resin which was particularly used in a high heat-resistance high temperature region, and the heat stabilization effect of the resin stabilizer was evaluated. The results are shown in Table 9.

Compounding

| | |
|---|---|
| Chlorinated vinyl chloride resin | 100 parts by weight |
| Mercapt Sn-type stabilizer | 0.7 part by weight |
| Ester-type wax | 1 part by weight |
| Sample | 1.05 parts by weight |

Molding Method

The above compounded composition was mixed by a roll mill at a temperature of 160° C. for 7 minutes to prepare a uniform mixture having a thickness of 0.4 mm. Then, the mixture was heated at a temperature of 180° C. under a pressure of 150 kg/cm² for 5 minutes to prepare a chlorinated vinyl chloride plate having a thickness of 1 mm, and a heat stabilizing effect was evaluated. The test plate was suspended in a Geer's color heat aging tester adjusted at a temperature of 190° C., and taken out every 10 minutes. The coloration degree of the test plate was evaluated by observation with eyes, and the time required until the plate was decomposed in dark brown was measured. The coloration degree was evaluated in a scale of 5 stages, and the results are shown in Table 9.

TABLE 9

| | Heat stabilization duration/evaluation stages (1–5) (minutes) | | | | | |
|---|---|---|---|---|---|---|
| Sample type (No.) | 10 | 20 | 30 | 40 | 50 | 60 |
| No. 1 | 1 | 1 | 2 | 2 | 2 | 4 |
| Blank | 1 | 2 | 2 | 5 | | |
| Hydrotalcite | 1 | 2 | 5 | | | |
| Calcium stearate | 1 | 4 | 5 | | | |

Application Example 4

With respect to dawsonite in accordance with a conventional method which was used in this invention, the following tests were performed.

4-1: Evaluation by a Soft Vinyl Chloride Resin

To confirm the heat stabilization effect on a vinyl chloride resin by a resin stabilizer of this invention, a soft vinyl chloride resin sheet was prepared in accordance with a compounding recipe and a molding method, and evaluated.

Compounding Recipe

| | | |
|---|---|---|
| Vinyl chloride resin (polymerization degree: 1050) | 100 | parts by weight |
| Di-octyl phthalate | 50 | parts by weight |
| Zinc laurate | 0.4 | part by weight |
| Dibenzoyl methane | 0.1 | part by weight |
| Dihydroxydiphenyl propane | 0.2 | part by weight |
| Sample (sample No. 12) | 1.3 | parts by weight |

Molding Method

The above compounded composition was kneaded by a roll mill at a temperature of 150° C. for 7 minutes to prepare a uniform mixture having a thickness of 0.5 mm. Thereafter, the mixture was heated at a temperature of 160° C. under a pressure of 130 kg/cm$^2$ for 5 minutes to prepare a soft vinyl chloride resin sheet, and the heat stabilizing effect, etc. were evaluated.

As a result, with regards to the warmth-keeping agent for resin of the present invention, the time required to reach black decomposition was 90 to 110 minutes, and the sheet had a transparency (transmission %) of 89 to 90%. When this warmth-keeping agent was added to the soft vinyl chloride resin, an excellent heat stabilization effect and an excellent transparency holding property were exhibited.

4-2: Evaluation by a Polypropylene Resin

To confirm a yellowness-preventive effect and a rust-preventive effect of polypropylene resin by a resin stabilizer of this invention, a polypropylene sheet was prepared in accordance with the following recipe by the following molding method, and evaluated.

Compounding Recipe

| | | |
|---|---|---|
| Polypropylene resin containing a halogen-remaining catalyst residue | 100 | parts by weight |
| Sample (sample No. 12) | 0.3 | part by weight |
| bis Phenol A | 0.1 | part by weight |

Molding Method

The above compounded composition was pelletized by using an extruder at 260° C. This sample pellet was placed in a metal frame of a stainless steel plate having a thickness of 1 mm, a length of 100 mm and a width of 100 mm, sandwiched between a thick ferro-type plate for photography and a 2-mm thick aluminum plate, and pressed at 230±3° C. for 30 minutes. The processed pellet was moved to a cooling press at 30±5° C., and cooled under a pressure of about 50 kg/cm$^2$ based on a molding plane of projection. After the mold became lower than 40° C., a polypropylene sheet having a thickness of 1 mm was taken out and tested as shown below.

As a result, the yellowness degree (N value) was 12 in a yellowness resistance test and the yellowness resistance was excellent. The dispersibility of the sheet by observation with an eye was very good.

4-3: A Warmth-Keeping Effect by an Ethylene-Vinyl Acetate Copolymer Resin (EVA)

When a resin warmth-keeping agent was added to EVA, the warmth-keeping effect on the resin was explained.

Compounding and Molding

| | | |
|---|---|---|
| EVA (vinyl acetate content = 15%, Ml = 1.5) | 100 | parts by weight |
| Ultraviolet absorbing agent | 0.1 | part by weight |
| Antioxidant | 0.1 | part by weight |
| Warmth-keeping agent | 5 | parts by weight |

The above starting materials were kneaded with stirring by a Henschel mixer. The resulting kneaded mixture was fed to a biaxial extruder, pelletized at a processing temperature of 150° C., and inflation-molded to obtain a film having a thickness of 100 μm and a width of 250 mm. Using this film, its warmth-keeping property was evaluated, and the results are shown in Table 10.

TABLE 10

| Warmth-keeping agent (sample No.) | 12 | 13 | H-8 |
|---|---|---|---|
| Yellowness resistance test | 12 | 13 | 21 |
| Haze | 8.5 | 8.9 | 8.5 |
| Warmth-keeping property(ΔT) | 1.5 | 2.0 | 0.9 |

As can be assumed from the transparency of the films of this invention and infrared absorption spectrum charts of the warmth-keeping agents of the present invention, the warmth-keeping effects of the warmth-keeping agents of this invention are better than the conventional resin warmth-keeping agent (H-8) as is clear from Table 10.

Application Example 5

The heat stabilizing effect of adding each of resin warmth-keeping agents composed of lithium aluminum complex type LAHCS and dawsonite-type NAHCS of the present invention (samples Nos. 6 to 11) obtained in Examples 5 to 10 to a chlorine-containing resin, the yellowness preventing effect and the dispersibility in the resin of adding each of the above complex-type hydroxide carbonate salts to a polyolefin resin containing a halogen-remaining catalyst residue, and the resin warmth-keeping effect of adding each of the above complex-type hydroxide carbonate salts to an ethylene/vinyl acetate copolymer resin will be explained.

5-1: Evaluation by Addition of a Soft Vinyl Chloride Resin

To confirm the heat stabilizing effect on vinyl chloride resin by adding the resin stabilizer, a soft vinyl chloride resin sheet was prepared by the following compounding and molding method and evaluated.

Compounding

| | | |
|---|---|---|
| Vinyl chloride resin (degree of polymerization:1050) | 100 | parts by weight |
| Dioctyl phthalate | 50 | parts by weight |
| Zinc laurate | 0.4 | part by weight |
| Dibenzoyl methane | 0.1 | part by weight |
| Dihydroxydiphenylpropane | 0.2 | part by weight |
| Samples (samples Nos. 6 and 7) | 10 | parts by weight |

Molding Method

The above compounded composition was kneaded by a roll mill at a temperature of 150° C. for 7 minutes to prepare a uniform mixture having a thickness of 0.5 mm. Then, the mixture was heated at 160° C. under a pressure of 130 kg/□ for 5 minutes to prepare a soft vinyl chloride resin sheet having a thickness of 1 mm, and its heat stabilization effect was evaluated.

As a result, the resin warmth-keeping agent showed a heat stabilization duration time of 90 to 110 minutes until the sample showed a black decomposition. The warmth-keeping agent also showed a transparency (percent transmission %) of 89 to 90%. When the warmth-keeping agent was added to a soft vinyl chloride resin, it exhibited an excellent heat stabilizing effect and an excellent transparency-retaining effect.

5-2: Evaluation by a Polypropylene Resin

To confirm a yellowness preventing effect and a rust preventing effect of a polypropylene by the addition of a resin stabilizer, a polypropylene sheert was prepared by the following compounding and molding procedures, and evaluated.

Compounding

| | |
|---|---|
| Polypropylene resin containing a halogen-remaining catalyst residue | 100 parts by weight |
| Silton JC-30 (AB agent made by Mizusawa Industrial Chemicals Co., Ltd.) | 0.05 part by weight |
| Samples (samples Nos. 6 and 8) | 0.3 part by weight |
| Bisphenol A | 0.1 part by weight |

Molding Method

The above compounded composition was pelletized at 260° C. by using an extruder. This sample pellet was placed in a stainless steel metal frame having a thickness of 1 mm and a vertical length and a transverse length of 100 mm×100 mm and was overlapped and sandwiched between a photographic thick ferro-type plate and a 2 mm-thick aluminum plate. It was then pressed at 230±3° C. for 30 minutes and then transfered to a cooling press at 30±5° C. It was then cooled under a pressure of about 50 kg/cm² per molding plane of projection. When the metal mold became lower than 40° C., a polypropylene sheet having a thickness of 1 mm was taken out, and tested in the following manner. As a result, it had an excellent yellowness degree (N value) of 12 and 13 in the yellowness degree test, and furthermore, the sheet had a very good dispersibility by observation with eye.

5-3: Warmth-Keeping Effect on an Ethylene/Vinyl Acetate Copolymer Resin (EVA)

A warmth-keeping effect of adding each of the resin warmth-keeping agents (Examples 5 to 10) of this invention to EVA will be described.

Compounding and Molding

| | |
|---|---|
| EVA (vinyl acetate content: 15%; MI = 1.5) | 100 parts by weight |
| Ultraviolet absorbing agent | 0.1 part by weight |
| Antioxidant | 0.1 part by weight |
| Warmth-keeping agent | 10 parts by weight |

The above starting materials were kneaded with stirring in a Henschel mixer. The resulting kneaded product was fed into a biaxial extruder and pelletized at a processing temperature of 150° C., and then the pellet was inflation-molded to give a film having a width of 250 mm and a thickness of 100 μm. The warmth-keeping property of the resulting film was evaluated, and the results are shown in Table 11.

TABLE 11

| Type of the warmth-keeping agent (sample No.) | 6 | 7 | 8 | 9 | 10 | 11 | H-7 |
|---|---|---|---|---|---|---|---|
| Haze | 10 | 10 | 7.5 | 7.7 | 7.5 | 7.5 | 17.7 |
| Warmth-keeping property (ΔT) | 1.7 | 1.7 | 2.1 | 1.9 | 2.0 | 1.8 | 1.4 |

EFFECT OF THE INVENTION

According to this invention, by using amorphous or pseudo-boehmite-type hydrated alumina as a starting aluminum component and aluminum metal carbonate salt or bicarbonate salt, and maintaining the $Al_2O_3$ concentration in the reaction system in a high condition, it was possible to synthesize the alkali aluminum complex hydroxide carbonate salt. Furthermore, by using gibbsite as the starting aluminum, it was possible to synthesize a lithium aluminum complex hydroxide carbonate salt by a migration method.

By maintaining the concentration of the starting material in the reaction system high, the synthesis in a relatively short period of time becomes possible, and the filtration and washing of the product can be extremely easy and an economically and industrially advatageous production method can be provided with good productivity and efficiency.

The lithium aluminum complex hydroxide carbonate salts (LAHCS) in accordance with this invention are useful as compounding agents such as a stabilizer (halogen capturing agent), an anti-blocking agent, and a warmth-keeping agent (infrared absorbing agent) for thermoplastic resins, especially olefin resins.

Furthermore, dawsonite-type sodium aluminum complex hydroxide carbonate salts (NAHCS) of this invention can be dispersed easily in resins, and have a markedly reduced deterioration tendency, and are useful as compounding agents for resins, especially as a warmth-keeping agent. Especially, NAHCS has excellent transparency in a condition which it is compounded in a resin, shows a broad infrared ray spectrum absorption and gives a resin film having excellent warmth-keeping property in comparison with hydrotalcite which is used as a conventional resin warmth-keeping agent.

What is claimed is:

1. A process for producing a lithium aluminum complex hydroxide carbonate salt, which comprises reacting amorphous or pseudo-boehmite hydrated alumina gel and a lithium carbonate or bicarbonate in an aqueous medium under such a condition that the concentration of aluminum, calculated as alumina ($Al_2O_3$), based on the total amount of the aqueous medium and the materials added to the aqueous medium, becomes 1 to 5% by weight, and the pH at the termination of the reaction becomes 7 to 11, wherein the hydrated alumina is reacted with the carbonate or the bicarbonate so that the amount of the carbonic acid ion is at least 0.25 mole based on the total aluminum atoms and wherein the reaction is carried out at a temperature of 50 to 90° C.

2. A process accord to claim 1 wherein the amorphous or pseudo-boehmite hydrated alumina gel is obtained by simultaneously mixing basic aluminum sulfate or aluminum sulfate and an alkali carbonate, said alkali carbonate being present in an amount sufficient to form a hydrated gel with the aluminum salt, forming the hydrated alumina gel, and separating and washing the gel with water.

3. A lithium aluminum complex hydroxide carbonate salt according to claim 1 wherein when the lithium aluminum complex hydroxide carbonate salt is formed into an aqueous slurry having a concentration of 5% by weight, the slurry of the carbonate salt has a specific resistance of at least 8000 $\Omega \cdot cm$.

4. A process for producing a lithium aluminum complex hydroxide carbonate salt, which comprises reacting a powder of gibbsite aluminum hydroxide with a lithium salt of carbonic acid, or a combination of a lithium compound and a carbonate salt capable of forming a carbonic acid ion and a lithium ion in the presence of water.

5. A process according to claim 4 wherein the reaction is carried out at a temperature of at least 70° C. at a pH of 9 to 13.

6. A process according to claim 4 wherein the gibbsite aluminum hydroxide fine powders have an average particle diameter of 0.5 to 5 $\mu m$, and the fine powders are composed of 2% by weight or less of coarse particles having a particle diameter of at least 20 $\mu m$.

7. A process according to claim 4 wherein the concentration of the gibbsite aluminum hydroxide particles in the reaction system is maintained at a high concentration of 10 to 20% by weight.

8. A lithium aluminum complex hydroxide carbonate salt which has a composition represented by formula (6a)

$$mAl_2O_3 \cdot nM_2O \cdot X \cdot kH_2O \tag{6a}$$

wherein X represents an inorganic anion composed mainly of a carbonic acid radical, M represents an alkali metal composed mainly of lithium, m is a number from 1.5 to 2.5, n is a number from 0.1 to 1, and k is a number from 0 to 10,
and which has an X-ray diffraction pattern shown below

| Spacing d (Å) Index of a plane | Peak intensity |
| --- | --- |
| 7.50 to 7.64 (002) | Large |
| 4.30 to 4.44 (110) | Small |
| 3.70 to 3.84 (004) | Large |
| 2.45 to 2.58 (006) | Medium |
| 2.20 to 2.30 (016) | Small |
| 1.85 to 2.08 (017) | Small |

-continued

| Spacing d (Å) Index of a plane | Peak intensity |
| --- | --- |
| 1.40 to 1.52 (330) | Small |
| 1.38 to 1.48 (600) | Small | the lamination asymmetry index (Is) being defined by $$Is = \tan \theta_2 / \tan \theta_1 \tag{7}$$

wherein $\theta_1$ represents an angle formed between a peak perpendicular and a peak tangent on the narrow angle side at an X-ray diffraction peak of a fixed spacing, and $\theta_2$ represents an angle formed between the peak perpendicular and a peak tangent on the wide angle side at the peak,
and the Is being 1.0 or below at the peak of an index of a plane (016) and 1.0 or below at the peak of an index of a plane (017).

9. A lithium aluminum complex hydroxide carbonate salt according to claim 8 wherein the degree of orientation (OD) defined by formular (8)

$$OD = I(002)/I(110) \tag{8}$$

wherein I (002) represents a relative intensity of a peak of X-ray diffraction (Cu-K$\alpha$) of the index of a plane (002) which appears at a spacing (d) of 7.67 to 7.84,
is smaller than 10.

10. A lithium aluminum complex hydroxide carbonate salt according to claim 8 wherein the carbonate salt has a bulk density as measured in accordance with JIS K6721 of 0.15 to 0.3.

11. A lithium aluminum complex hydroxide carbonate salt according to claim 8 wherein the carbonate salt has a particle diameter of 0.2 to 10 $\mu m$ as measured by a laser scattering diffraction method.

12. A compounding agent for resins which comprises the lithium aluminum complex hydroxide carbonate salt according to claim 8.

13. A warmth-keeping agent or an infrared ray absorbing agent wherein said agent comprises the lithium-aluminum complex hydroxide carbonate salt according to claim 8 and has a characteristic absorption spectrum in an infrared absorption region which has absorptions at wavenumbers of 547, 735, 1004 and 1375 $cm^{-1}$ with a wavenumber of 3443 $cm^{-1}$ as a main absorption.

14. A halogen capturing agent composed of the lithium aluminum complex hydroxide carbonate salt of claim 8.

* * * * *